US012755037B2

(12) United States Patent
Anjan

(10) Patent No.: US 12,755,037 B2
(45) Date of Patent: Oct. 6, 2026

(54) METHODS AND SYSTEMS FOR IDENTITY AND ACCESS MANAGEMENT AND GOVERNANCE USING A GRAPH DATABASE

(71) Applicant: CVS Pharmacy, Inc., Woonsocket, RI (US)

(72) Inventor: Milpesh S. Anjan, Woonsocket, RI (US)

(73) Assignee: CVS Pharmacy, Inc., Woonsocket, RI (US)

( * ) Notice: Subject to any disclaimer, the term of this patent is extended or adjusted under 35 U.S.C. 154(b) by 110 days.

(21) Appl. No.: 18/964,220

(22) Filed: Nov. 29, 2024

(65) Prior Publication Data

US 2025/0181737 A1 Jun. 5, 2025

Related U.S. Application Data

(60) Provisional application No. 63/604,310, filed on Nov. 30, 2023.

(51) Int. Cl.
*G06F 21/62* (2013.01)
*G06F 16/27* (2019.01)
*G06F 16/28* (2019.01)

(52) U.S. Cl.
CPC .............. *G06F 21/62* (2013.01); *G06F 16/27* (2019.01); *G06F 16/284* (2019.01)

(58) Field of Classification Search
CPC ........................................................ G06F 21/60
See application file for complete search history.

(56) References Cited

U.S. PATENT DOCUMENTS 12,602,508 B1 * 4/2026 Bethancourt ....... G06F 21/6227
2008/0256643 A1 * 10/2008 Jones .................... G06F 21/629 726/27
2010/0325122 A1 * 12/2010 Yassin ................. G06F 16/9535 707/693
2013/0138585 A1 * 5/2013 Forte ...................... G06Q 30/02 706/54
2015/0074044 A1 * 3/2015 Metreveli ......... G06F 16/24552 707/769
2016/0063134 A1 * 3/2016 Yu ....................... G06F 16/9024 707/746

(Continued)

*Primary Examiner* — Khang Do
(74) *Attorney, Agent, or Firm* — Leydig, Voit & Mayer, Ltd.

(57) ABSTRACT

A method is provided including updating a graph database based on generating one or more new nodes and edges for the graph database associated with onboarding information for a first user. The method includes extracting, from the updated graph database, extracted graph data for the first user and inputting at least a portion of the extracted graph data for the first user into one or more machine learning-artificial intelligence (ML-AI) models to obtain one or more recommended user applications. The method includes causing display of the one or more recommended user applications on a display device, receiving second user input indicating approval for granting access to at least one recommended user application from the one or more recommended user applications, and providing instructions to direct a second computing platform to grant access to the at least one recommended user application.

20 Claims, 14 Drawing Sheets

(56) References Cited

U.S. PATENT DOCUMENTS

| | | | | |
|---|---|---|---|---|
| 2016/0188671 | A1* | 6/2016 | Gupta | H04L 51/52 707/722 |
| 2016/0191534 | A1* | 6/2016 | Mallozzi | G06F 21/6218 726/4 |
| 2019/0108353 | A1* | 4/2019 | Sadeh | H04L 67/306 |
| 2019/0384926 | A1* | 12/2019 | Wu | G06F 21/6218 |
| 2021/0168150 | A1* | 6/2021 | Ross | G06F 16/9024 |
| 2023/0205898 | A1* | 6/2023 | Venable | G06F 21/6227 726/26 |
| 2023/0214949 | A1* | 7/2023 | Eidelman | G06Q 50/18 705/311 |
| 2024/0143798 | A1* | 5/2024 | Eberlein | G06F 21/604 |
| 2025/0181737 | A1* | 6/2025 | Anjan | G06F 21/62 |

* cited by examiner

300

METHODS AND SYSTEMS FOR IDENTITY AND ACCESS MANAGEMENT AND GOVERNANCE USING A GRAPH DATABASE

BACKGROUND

In some instances, enterprise organizations may seek to provide or deny access to a user for certain applications or information. For instance, when an enterprise organization onboards a new person (e.g., hires a new employee), the new person may be given access only to a limited number of applications, accessible locations, or certain information related to the new person's role, either to conserve computing resources by providing only necessary applications or because certain information is sensitive. This may be performed by creating an account for the user and having a static policy for each defined business role. However, due in part to the potential number of different applications and permissions (e.g., access types or roles) and/or the nature of the employee's role, determining the appropriate permissions for each onboarded person and requesting every permission may be a time consuming and challenging procedure. For instance, a manager may need to individually select each access for the person, ranging from a few to hundreds of separate accesses, creating a labor burden and a time consuming process for a manager in addition to lost productivity to the enterprise organization. Additionally, and/or alternatively, to the extent a computer program can refer to a library of lists of user accesses, the lists are unlikely to capture the complex considerations for the specific new person (e.g. the differences in the new person's role from a previous person's role, unique accesses for an expected location) and may create a drain on computing resources by referencing potentially millions of records of the enterprise organization each time a new user is onboarded. Moreover, maintaining the library of lists could institute its own labor cost and demand on computing resources, as each time a list for a given person's accesses needs to be updated individually and/or manually (e.g., by communicating the access from the person's department of the enterprise organization to the department that maintains the list). Furthermore, either the manager or the program are unlikely to accurately identify the relevant accesses need for the new person's role based on merely referencing isolated lists of accesses in the library given the lack of context for the accesses and any information associating those accesses to the previous person or role. Therefore, there remains a technical need to provide accurate permissions to effectively enable the new person with the appropriate applications in a timely manner.

SUMMARY

In some examples, the present application provides determining recommended permissions for a user and transmitting the recommended permissions to a member of an enterprise organization to review and/or approve. For instance, a graph database may be updated and/or generated that provides connections (e.g., edges) between different forms of managed data (e.g., the nodes) related to permissions for a user (e.g., the users current role, the past and current permissions of people in similar roles, the type of application, the risk associated with an application). Data may be extracted from the graph database and used as an input for one or more machine learning-artificial intelligence (ML-AI) models that are trained to determine recommended permissions of the user. Those recommended permissions may then be reviewed (e.g., by a manager of the user in the enterprise organization) and used to help provide more accurate and responsive user permissions recommendations.

In some instances, the graph database is updated with temporal information. For example, when a new user is onboarded (e.g., initially added), the new data of the user may be used to update the graph database with new nodes and edges and/or to update existing nodes and/or edges. When the user takes on a new role or updates their data, the graph database may be updated to include this current data in addition to the past data from when the user was onboarded. Additionally, the graph database may synchronize with all currently available data on a regular basis. Therefore, the graph database may provide historical data, up-to-date data, and dynamic connections and insights between that data to the one or more ML-AI models for recommending user permissions. This may allow for flexible and adaptive access management, in addition to providing more specific and foresighted recommended permissions tailored to the user.

In one aspect, a method is provided. The method includes updating a graph database based on generating one or more new nodes and one or more new edges for the graph database. The one or more new nodes and the one or more new edges are associated with onboarding information for a first user. The method also includes extracting, from the updated graph database, extracted graph data for the first user; inputting at least a portion of the extracted graph data for the first user into one or more machine learning-artificial intelligence (ML-AI) models to obtain one or more recommended user applications; and causing display of the one or more recommended user applications on a display device. The method also includes receiving second user input indicating approval for granting access to at least one recommended user application from the one or more recommended user applications; and providing instructions to direct a second computing platform to grant access to the at least one recommended user application.

Examples may include one of the following features, or any combination thereof. For instance, in some examples of the method, inputting at least the portion of the extracted graph data for the first user into the one or more ML-AI models further includes inputting a first portion of the extracted graph data for the first user into one or more first ML-AI models to obtain a plurality of intermediate recommended user applications; and determining the one or more recommended user applications based on inputting a second portion of the extracted graph data for the first user and the plurality of intermediate recommended user applications into one or more second ML-AI models.

In some instances, determining the one or more recommended user applications includes inputting the second portion of the extracted graph data for the first user and the plurality of intermediate recommended user applications into the one or more second ML-AI models to determine one or more user permissions; and determining the one or more recommended user applications based on the one or more user permissions and the plurality of intermediate recommended user applications.

In some variations, extracting the extracted graph data for the first user includes extracting the first portion of the extracted graph data, and the first portion includes a user title, a user role, a user job code, a user department, a user identification, access controls of a peer of the user, a user manager, and/or a hierarchy of the first user; and extracting the second portion of the extracted graph data, and the second portion includes a system risk classification, a permissions risk classification, a system data classification, a permissions data classification, and/or a compliance requirement.

In some examples, updating the graph database based on generating the one or more new nodes and the one or more new edges further includes generating the one or more new nodes based on the onboarding information for the first user; and generating the one or more new edges to connect the one or more new nodes to existing nodes from the graph database.

In some instances, updating the graph database based on generating the one or more new nodes and the one or more new edges for the graph database further includes generating, based on the onboarding information for the first user, the one or more new nodes and the one or more new edges for the graph database; obtaining, from an onboarding organization of the first user, application data related to an application associated with the onboarding information for the first user; and generating, based on the application data related to an application, one or more further new nodes and one or more further new edges for the graph database. Extracting, from the updated graph database, extracted graph data for the first user further includes extracting extracted graph data from the one or more new nodes, the one or more new edges, the one or more further new nodes, and the one or more further new edges for the graph database.

In some variations, updating the graph database based on generating the one or more new nodes and the one or more new edges for the graph database further includes obtaining, from an onboarding organization of the first user, application data related to an application; generating, based on the application data related to an application, one or more further new nodes for the graph database; and generating, based on the onboarding information for the first user, the one or more new nodes and one or more new edges between the one or more new nodes and the one or more further new nodes. Extracting, from the updated graph database, extracted graph data for the first user further includes extracting extracted graph data from the one or more new nodes, the one or more new edges, the one or more further new nodes, and the one or more further new edges for the graph database.

In some examples, updating the graph database based on generating the one or more new nodes and the one or more new edges for the graph database further includes generating, for one or more existing nodes for the graph database, the one or more new nodes and the one or more new edges associated with the onboarding information for the first user, wherein each of the one or more new nodes for a respective one or the existing nodes is associated with different time periods of validity.

In some instances, the method further includes receiving a request to update user application access permissions for the first user; in response to the request, inputting information into the one or more ML-AI models to obtain one or more updated recommended user applications for the first user; and providing instructions to direct the second computing platform to grant or restrict access to the first user based on the one or more updated recommended user applications for the first user.

In some variations, the method further includes generating, based on data obtained after onboarding the first user, one or more updated nodes for a respective one of the one or more new nodes, wherein the one or more updated nodes and the one or more new nodes are associated with the same data element. Extracting, from the updated graph database, the extracted graph data for the first user further includes extracting graph data from the one or more updated nodes and the one or more new nodes.

In some examples, the method further includes before generating one or more new nodes and one or more new edges for the graph database, storing an existing graph database in memory, the existing graph database comprising one or more existing nodes and one or more existing edges; and updating the existing graph database into the updated graph database based on generating the one or more new nodes and the one or more new edges. Extracting, from the updated graph database, the extracted graph data for the first user further includes retrieving the existing graph database from memory; and extracting graph data from the one or more updated nodes, the one or more new nodes, the one or more existing nodes, and the one or more existing edges.

In some instances, the method further includes storing one or more recommendations output by the one or more ML-AI models in memory, wherein the one or more recommendations are associated with the obtained recommended user applications; training the one or more ML-AI models based on the one or more stored recommendations and the second user input indicating approval for granting access to at least one recommended user application; and storing the trained one or more ML-AI models in memory. Inputting at least the portion of the extracted graph data for the first user into the one or more ML-AI models further includes retrieving the trained one or more ML-AI models from memory.

In some variations, the method further includes storing one or more recommendations output by the one or more ML-AI models in memory, wherein the one or more recommendations are associated with the obtained recommended user applications; training the one or more ML-AI models based on the one or more stored recommendations and applications currently associated with the first user in the updated graph database; and storing the trained one or more ML-AI models in memory. Inputting at least the portion of the extracted graph data for the first user into the one or more ML-AI models further includes retrieving the trained one or more ML-AI models from memory.

In another aspect, a system is provided. The system includes an enterprise computing platform configured to update a graph database based on generating one or more new nodes and one or more new edges for the graph database, wherein the one or more new nodes and the one or more new edges are associated with onboarding information for a first user; extract, from the updated graph database, extracted graph data for the first user; and input at least a portion of the extracted graph data for the first user into one or more ML-AI models to obtain one or more recommended user applications. The system also includes a user device including a display device and an input device, the user device configured to receive, from the enterprise computing platform, the one or more recommended user applications; display the one or more recommended user applications on the display device; and receive, from the input device, second user input indicating approval for granting access to at least one recommended user application from the one or more recommended user application. The system also includes a second computing platform configured to receive instructions to grant access to the at least one recommended user application.

In some instances, inputting at least the portion of the extracted graph data for the first user into the one or more ML-AI models further includes inputting a first portion of the extracted graph data for the first user into one or more first ML-AI models to obtain a plurality of intermediate recommended user applications; and determining the one or more recommended user applications based on inputting a second portion of the extracted graph data for the first user and the plurality of intermediate recommended user applications into one or more second ML-AI models.

In some examples, updating the graph database based on generating the one or more new nodes and the one or more new edges further includes generating the one or more new nodes based on the onboarding information for the first user; and generating the one or more new edges to connect the one or more new nodes to existing nodes from the graph database.

In some variations, updating the graph database based on generating the one or more new nodes and the one or more new edges for the graph database further includes generating, for one or more existing nodes for the graph database, the one or more new nodes and the one or more new edges associated with the onboarding information for the first user. Each of the one or more new nodes for a respective one or the existing nodes is associated with different time periods of validity.

In another aspect, a non-transitory computer-readable medium having processor-executable instructions stored thereon is provided. The processor-executable instructions, when executed by one or more processors, facilitate updating a graph database based on generating one or more new nodes and one or more new edges for the graph database, wherein the one or more new nodes and the one or more new edges are associated with onboarding information for a first user; extracting, from the updated graph database, extracted graph data for the first user; inputting at least a portion of the extracted graph data for the first user into one or more ML-AI models to obtain one or more recommended user applications; causing display of the one or more recommended user applications on a display device; receiving second user input indicating approval for granting access to at least one recommended user application from the one or more recommended user applications; and providing instructions to direct a second computing platform to grant access to the at least one recommended user application.

In some instances, inputting at least the portion of the extracted graph data for the first user into the one or more ML-AI models further includes inputting a first portion of the extracted graph data for the first user into one or more first ML-AI models to obtain a plurality of intermediate recommended user applications; and determining the one or more recommended user applications based on inputting a second portion of the extracted graph data for the first user and the plurality of intermediate recommended user applications into one or more second ML-AI models.

In some examples, updating the graph database based on generating the one or more new nodes and the one or more new edges for the graph database further includes generating, for one or more existing nodes for the graph database, the one or more new nodes and the one or more new edges associated with the onboarding information for the first user. Each of the one or more new nodes for a respective one or the existing nodes is associated with different time periods of validity.

All examples and features mentioned herein may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following.

DETAILED DESCRIPTION

Figure 1:
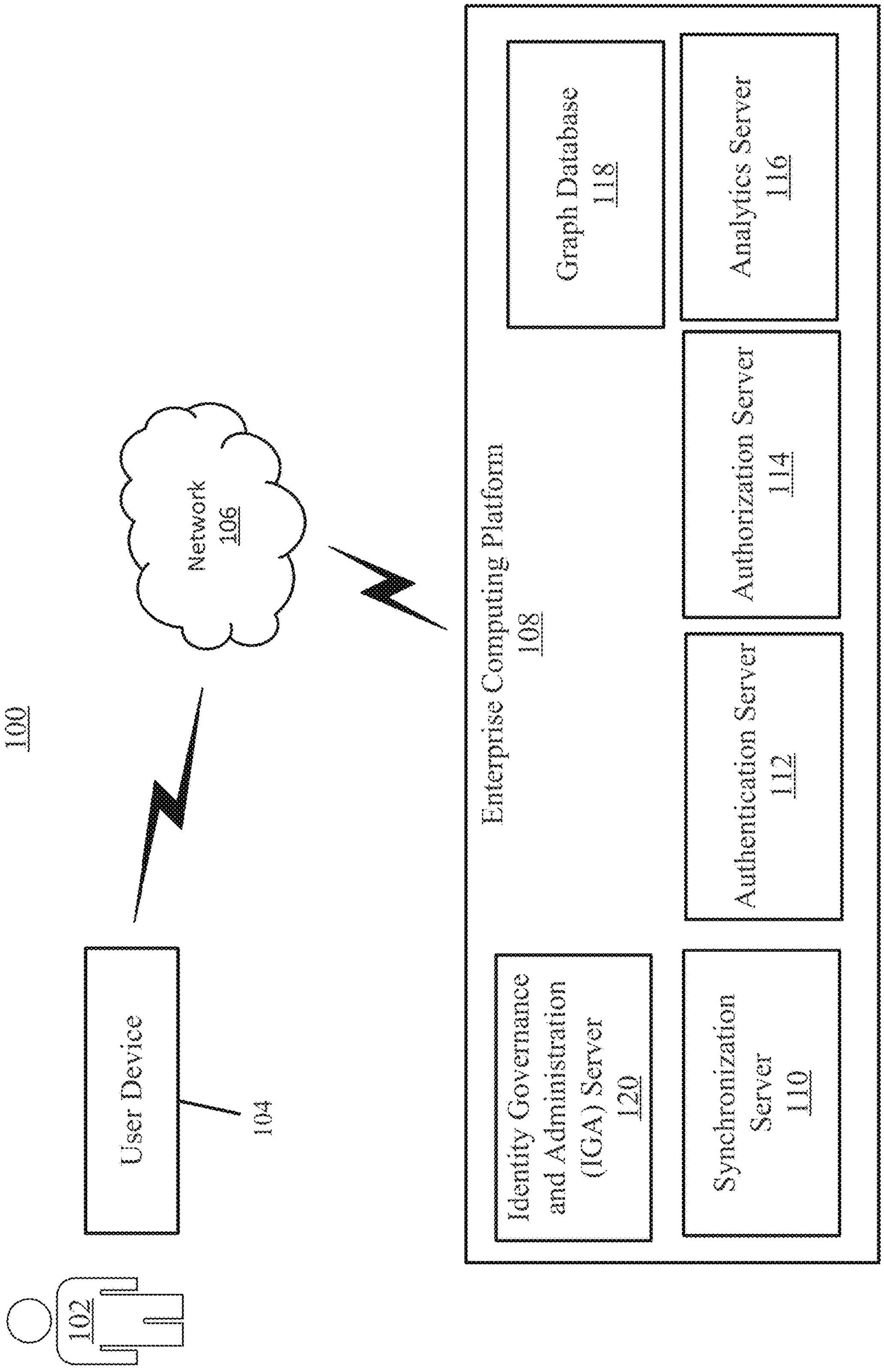
FIG. 1 is a simplified block diagram depicting an exemplary permissions environment in accordance with one or more examples of the present application.

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Examples of the present application may provide improvements over the prior art by reducing the labor cost and demand on computing resources. For example, the present application may identify the appropriate access policies by generating and identifying the context and associations between different accesses and user roles and identities, and thereby improve the accuracy of the recommendations. For instance, whereas managers would previously need to review a list of recommended accesses without indication of importance, the present application may more accurately identify which accesses should receive specific review (e.g., by indicating specific accesses in the recommended accesses) based on those accesses having a less common node and edge relationship (e.g., 40% or 50% of corresponding user identity/roles associated with the specific access) than the more common node and edge relationship (e.g., 70% or 80% of corresponding user identity/roles associated with the specific access) of other recommendations in the graph database. As a result, the manager may receive a reduction in the labor burden of compiling and reviewing the access policies, and the list may consider the contexts and associated roles, policies, and identities in the generation of the recommendation by reviewing a more focused portion of the access repository (e.g., the library of user access policies of the enterprise organization).

Additionally, and/or alternatively, the present application may provide improvements over the prior art by reducing the labor cost and demand on computing resources for updating the access policies for different roles and users of the enterprise organization by synchronizing the different accesses and user roles and identities with the access policies of the enterprise organization. For instance, the present application may continuously receive and police the access policy recommendations of different departments and associated user changes such that as new information comes into the graph database (e.g., when a user onboarding triggers a graph database synchronization event), the graph database updates. As a result, one or more models may continuously take into account accurate and up to date access for requested access policies each role and user identity (e.g., which departments, what roles, any transfers between departments and roles and associated access policy changes) by extracting the access data from the nodes and edges of the graph database.

Additionally, and/or alternatively, the present application may provide improvements over the prior art by increasing the accuracy of access policy recommendations through the enablement of lifelong learning. For example, the present application may provide different recommendations for each new person's access policy request and/or multiple different access recommendations in response to each new person's access policy request. As the recommendations are approved and/or revised, the present application may incorporate these approvals and/or revisions into the graph database. Therefore, even if previous systems may have generated the same access recommendation, the present application may base future recommendation outputs on the previously approved and/or revised recommendations, thereby continuously updating and improving the recommendations of the present application via lifelong learning.

Systems, methods, and computer program products are herein disclosed that use one or more graph databases to obtain (e.g., determine) security access recommendations for a user. FIG. 1 is a simplified block diagram depicting an exemplary environment in accordance with an example of the present application. The environment 100 includes an enterprise computing platform 108, a user 102, a network 106, and a user device 104. Although the entities within environment 100 may be described below and/or depicted in the FIGS. as being singular entities, it will be appreciated that the entities and functionalities discussed herein may be implemented by and/or include one or more entities.

The entities within the environment 100 such as the enterprise computing platform 108 and the user device 104 may be in communication with each other within the environment via network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. Additionally, the network 106 may support or include communication protocols such as WI-FI or BLUETOOTH.

The enterprise computing platform 108 is a computing platform that is associated with an enterprise organization. The enterprise organization may be any type of corporation, company, organization, and/or other institution. In some instances, the enterprise organization may employ, direct, and/or be otherwise be associated with the management of personnel. For example, a new employee may be hired (e.g., by the enterprise organization or by a third party company using the enterprise organization's services). The enterprise organization may perform or assist the performance of onboarding the new personnel into a permissions structure and/or perform dynamic access review.

The enterprise computing platform 108 may include a graph database 118, which may generate, store, and/or manage graph structures. For example, in some instances, the enterprise organization may hire a new employee or change the role of an existing employee within the enterprise organization, and information may be extracted from the graph database 118 that may be used to obtain one or more recommended user applications and/or permissions for the employee. For example, when a new employee is hired, an account may be set up in the enterprise organization's management system that includes information related to the new employee such as the employee's department, manager, title, and/or employment status. The new employee may need access to certain applications to perform their employment, such as e-mail, word processing applications, internet access, and/or applications which may access confidential information related to the enterprise organization. The enterprise computing platform 108 may utilize and/or generate a graph database 118 that may associate relevant data from the employee's profile and the enterprise organization. For example, the graph database 118 may utilize one or more machine learning-artificial intelligence (ML-AI) models to process the received data and generate meaningful information about the relations between portions of the received data. For instance, the graph database 118 may generate direct and indirect relations between portions of the received data (e.g., between data elements). The graph database 118 may associate a data element related to a first employee's hierarchy position to a data element related to a second employee whom the first employee reports to, thereby generating a direct relationship. Additionally, and/or alternatively, graph database 118 may associate a data element related to a third employee (to whom the second employee reports) to a data element related to the first employee's hierarchy position, thereby generating an indirect relationship. Each generated relationship may then be seen as a "hop" between connected data elements, where the first employee and the third employee are connected through two hops.

The graph database 118 may also store the received data, received graph structures, and/or any graph structures generated by the graph database 118 utilizing the one or more ML-AI models. Data may be extracted from this graph database 118 and input to one or more ML-AI models to obtain recommendations for applications and/or permissions (e.g., accesses, entitlements) for the employee, and a manager may review the recommended applications and/or permissions for final approval before granting access to the employee's account. While application permissions are described above, recommendations may be provided for access to different types of confidential information within the same application or file system and/or recommendations for permissions generally (e.g., permissions for access to certain rooms or zones within a building).

The enterprise computing platform 108 may include one or more ML-AI models such as one or more authorization ML-AI models and/or one or more authentication ML-AI models. In some instances, the ML-AI models may be generic ML-AI models (e.g. untrained models). The enterprise computing platform 108 may train one or more of the generic ML-AI models prior to providing them to a server (e.g., an authorization server 114 and/or an authentication server 112). Additionally, and/or alternatively, the enterprise computing platform may provide the one or more generic ML-AI models to a server before the generic ML-AI models are trained, and the server that received the models from the platform 108 may train the generic ML-AI models and/or use the ML-AI models to perform one or more tasks.

The enterprise computing platform 108 includes one or more computing devices, computing platforms, systems, servers, and/or other apparatuses capable of performing tasks, functions, and/or other actions for the enterprise organization. The enterprise computing platform 108 may be implemented using one or more computing platforms, devices, servers, and/or apparatuses. In some variations, the enterprise computing platform 108 may be implemented as engines, software functions, and/or applications. In other words, the functionalities of the enterprise computing platform 108 may be implemented as software instructions stored in storage (e.g., memory) and executed by one or more processors.

The enterprise computing platform 108 may include a synchronization server 110. The synchronization server 110 may receive data from other entities of environment 100 and generate a graph structure (e.g., the graph structure 402 and/or 404 shown in FIGS. 4B and 4C as described below) for the graph database 118 based on the received data. The synchronization server 110 may provide this generated graph structure to the graph database 118 and/or the identity governance and administration (IGA) server 120. For example, the synchronization server 108 may receive data from a human resources (HR) department of the enterprise organization, and that received data may include one or more data elements (e.g., user 102's manager, role, date of employment). The synchronization server 118 may generate a graph structure for one or more data elements of the received data, and provide that graph structure to the graph database 118 to be used as a new graph and/or to synchronize the existing graph database 118 with the newly-generated graph structure.

The enterprise computing platform 108 may include an IGA server 120. The IGA server 120 may receive (e.g., from the synchronization sever 110 and/or the graph database 118) the graph structure generated by the synchronization server 110 and modify (e.g., change, update) the graph structure over time. The IGA server 120 may also receive one or more ML-AI models from the analytics server 116 and/or receive outputs from the one or more ML-AI models from the analytics server 116. For example, the IGA server 120 may manage the life cycle of data for the graph database 118 as the data is accessed or generated. For instance, when user 102 is onboarded, the IGA server 120 may modify the graph structure (e.g., generated by the synchronization server 110 and/or the of the graph database 118) based on this event. Additionally, and/or alternatively, when an interval of time has passed (e.g., 6 months since onboarding), the IGA server 120 may modify the generated graph structure to move a current version of a node of the one or more data elements to a past version of the same node of the one or more data elements and update and/or generate a current version of the node. Additionally, and/or alternatively, when user 102's access to an application or information is added or removed, or a different user's access related to user 102, the IGA server 120 may add or remove the access to the graph structure generated by the synchronization server 110. Additionally, and/or alternatively, the IGA server 120 may send data for the managed graph structures to the analytics server 116 and receive one or more outputs from the analytics server 116 to assist in processing any modifications to the graph structure. For example, when a user 102 is onboarded to the enterprise organization, the user 102 may receive a user device 104 (e.g., associated with a digital or physical badge) to access certain locations associated with the enterprise organization and/or applications associated with the enterprise computing system 108. The analytics server 116 may receive data from the onboarding process and send processed data to the IGA server 120 for managing the permissions associated with the badge or user device 104 associated with the user 102.

The enterprise computing platform 108 may include an analytics server 116. The analytics server 116 may receive data from other entities of the environment 100 and process the data using one or more ML-AI model. For example, the analytics server 116 may receive graph structures from the graph database 118 and input the received data (e.g., graph structures) to one or more ML-AI models to assist the prediction of recommended permissions. For instance, the analytics server 116 may receive data and, using one or more ML-AI models, output the recommended user permissions for review by a member associated with the enterprise organization. Additionally, and/or alternatively, the analytics server 116 may produce data for an input to another ML-AI model, which then produces the recommended user permissions (e.g., in a chain of models). Accordingly, the analytics server 116 may provide enough flexibility to receive, leverage, and provide different data to and from different entities of the environment 100. Additionally, and/or alternatively, the analytics server 116 may provide an output of one or more ML-AI models to multiple entities of the environment 100 (e.g., graph database 118, user device 105, authentication server 112), which output may then be stored and/or processed based on the type of output of the analytics server 116. For example, an output intended as an input to one or more further ML-AI models may be stored in the respective further ML-AI model's server (e.g., graph database 118, IGA server 120), which may provide the advantage of conserving computing resources through efficient distribution of data processing demands. To provide further efficient use of computing resources, the analytics server 116 may provide analytics based on a requested (e.g., limited) category of data, such as limiting the data processed to all data indirectly connected by 2 or 3 'hops' as described above, and/or by specifying a level of the organization to consider.

The enterprise computing platform 108 may include an authentication server 112 and an authorization server 114. The authentication server 112 and the authorization server 114 may receive data from the onboarding process of the user 102, graph structures from the graph database 118, and/or permissions and access for the user 102 from the IGA server 120, graph database 118, and/or the analytics server 116. The authentication server 112 may then authenticate the identification of a user 102 and/or a user device 104, based on the onboarding data and/or the received permissions and accesses for the user 102, for when an attempt to access a location or an application associated with an enterprise organization occurs. The authorization server 114 may authorize access to the location or application associated with the enterprise organization, based on the onboarding data and/or the received permissions and accesses for the user 102.

User 102 may operate, own, and/or otherwise be associated with a user device 104, and the user 102 and user device 104 may also be a member of the enterprise organization. For instance, the user device 104 may be a laptop, desktop, or mobile phone such as a smartphone that is owned and/or operated by the user 102 (e.g., accessed by logging into a user account and/or profile) while the user 102 is employed by the enterprise organization. The user device 104 may be and/or include, but is not limited to, a desktop, laptop, tablet, mobile device (e.g., smartphone device or other mobile device), smart watch, IOT device, or any other type of computing device that generally comprises one or more communication components, one or more processing components, and one or more memory components. The user device 104, when present, may be able to execute software applications managed by, in communication with, and/or otherwise associated with the enterprise organization. The software application may be an application that is used by the user device 104 to access data of the enterprise organization, generate products and/or information (e.g., MatLAB, EXCEL), approve applications permissions, and/or communicate with the enterprise computing platform 108 and/or other entities (e.g., e-mail, internet browsers, and mobile applications). These communications between the user device 104 and the other entities of environment 100 may occur over the network 106. Additionally, and/or alternatively, the user device 104 may communicate with each other and/or other entities within environment 100 without using the network 106 (e.g., via communication protocols such as WI-FI or BLUTOOTH).

The user 102 may provide information to enterprise computing platform 108 using the user device 104. The user 102 may also receive information from other entities of environment 100 such as the enterprise computing platform 108 using the user device 104. For example, the user device 104 may receive an indicator or information regarding a recommended permission for an application and cause display of the recommendation, and the user 102 may take one or more actions in response to the recommendation, such as to approve, modify, or reject the recommended permissions. Before, during, or after user input in response to the received indicator, the user device 104 may provide information to enterprise computing platform 108 regarding the action taken or to be taken.

While the IGA server 120, synchronization server 110, authentication server 112, authorization server 114, and analytics server 116 are shown in FIG. 1, in some examples, the enterprise computing platform 108 may include additional servers and/or databases such as servers that communicate data with any of servers 110, 112, 114, 116, and/or 120. For example, a server containing further managed data (e.g., a server including past employee records and/or other confidential information of an enterprise organization) and/or a server providing ML-AI model computational services may receive data from and/or provide data to any of servers 110, 112, 114, 116, and/or 120.

It will be appreciated that the exemplary environment depicted in FIG. 1 is merely an example, and that the principles discussed herein may also be applicable to other situations-for example, including other types of institutions, organizations, devices, systems, and network configurations. For instance, any of the entities (e.g., analytics server 116, graph database 118) of enterprise computing platform 108 may be distributed across different platforms or devices of the enterprise organization or of a third party. For example, the enterprise computing platform 108 may provide, via network 106, data from the graph database 118 to a third party analytics server 116 for recommended permissions and may receive the output of the analytics server 116 via network 116. Moreover, any of the servers may perform the additional functionalities of any of the other servers separately or in combination to provide data for recommending user permissions.

Figure 2:
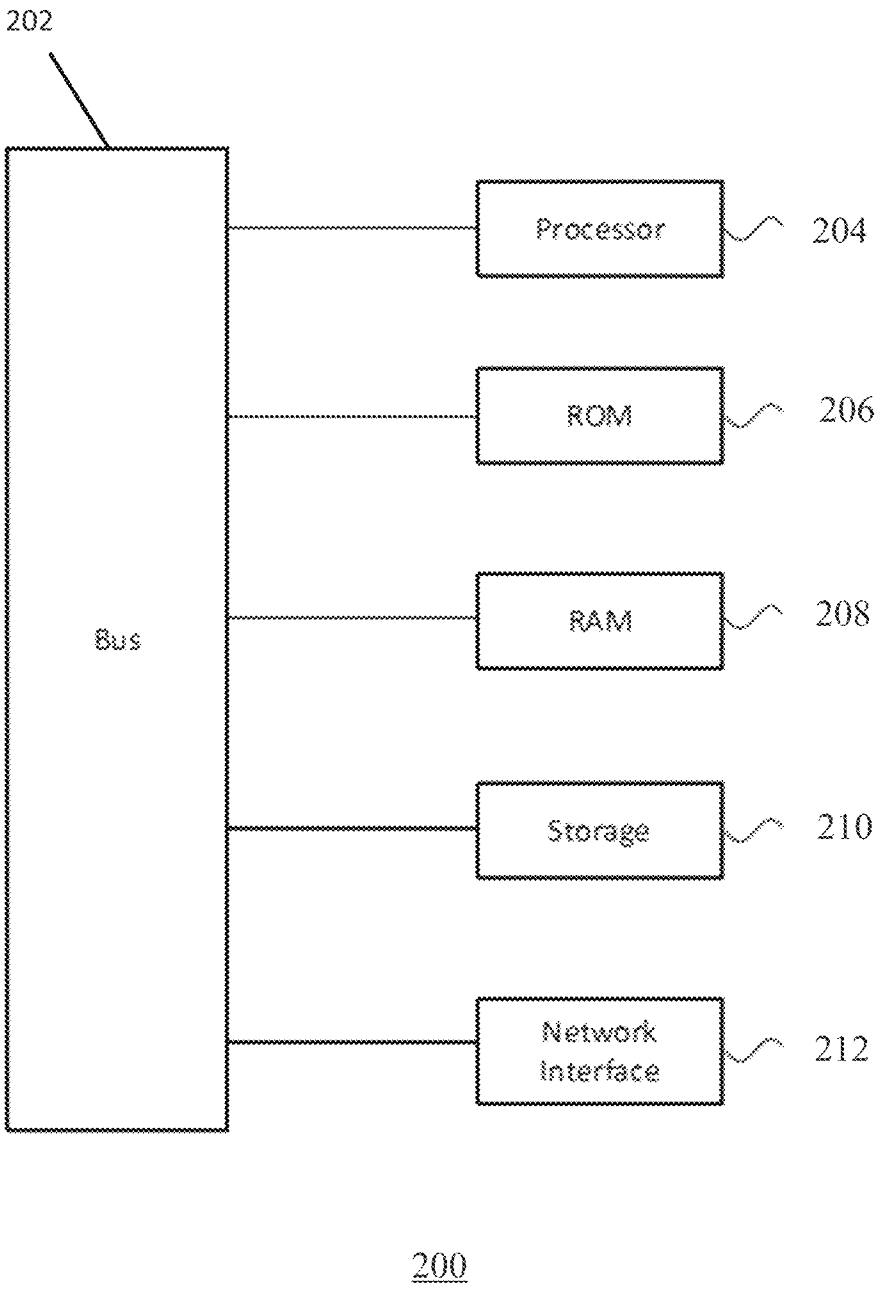
FIG. 2 is a simplified block diagram of one or more devices or systems within the exemplary environment of FIG. 1.

FIG. 2 is a block diagram of an exemplary system and/or device 200 within the environment 100. The device/system 200 includes a processor 204, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component within the device/system 200. For example, as will be described below, the enterprise computing system 108 and the user device 104 may include some of the components within the device/system 200 and may also include further components such as one or more sensors and/or devices. Additionally, and/or alternatively, the device/system 200 may further include components that might not be included within every entity of environment 100.

Figure 3:
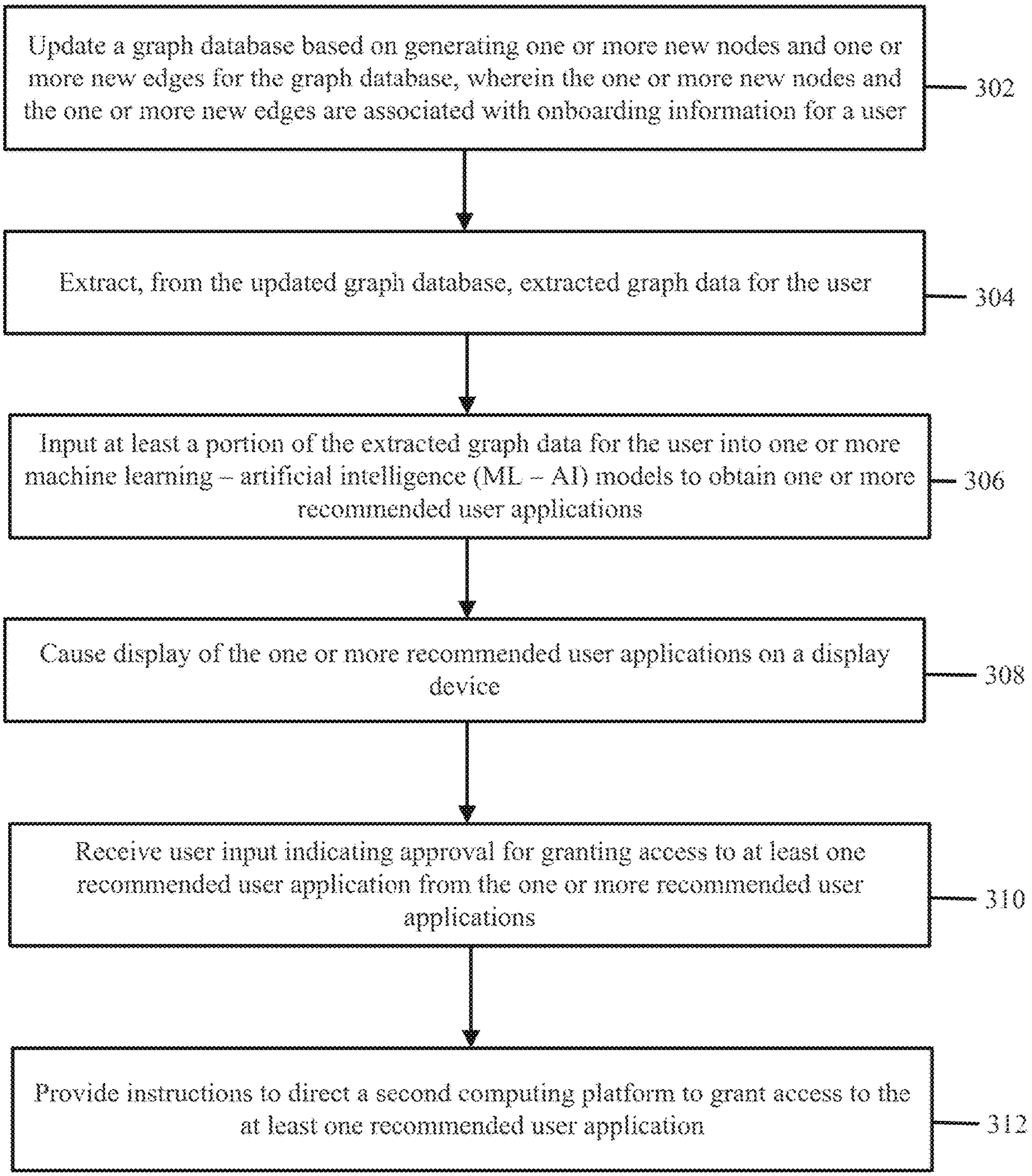
FIG. 3 is an exemplary process for using the exemplary permissions environment to update a graph database in accordance with one or more examples of the present application.

FIG. 3 is an exemplary process for permissions and security and/or identity access management and governance using a graph database. The process 300 may be performed by an entity of the environment 100 (e.g., the enterprise computing platform 108). For example, when a user is onboarded (e.g., a new hire or a position change), the enterprise computing platform 108 may perform a user onboarding process to verify the user, create an account for user, and provide the proper access for joining the organization. The access may be granted with roles and entitlements to any applications and systems. The enterprise computing platform 108 may generate, obtain, and/or update a graph database that includes data from different departments such as HR, IT, cybersecurity, and/or legal and compliance so as to include information about the user obtained during onboarding. For instance, the enterprise computing platform 108 may generate new nodes and edges for the graph database to represent this information. The enterprise computing platform 108 may further extract data from this updated graph database and provide the extracted data as input to one or more ML-AI models. These one or more ML-AI models may output, based on the extracted data from the graph, a recommendation regarding the applications and/or permissions that should be granted to the user (e.g., whether user should be able to access data on certain servers, or whether user should be provided certain applications), where the applications and/or permissions may be related to resources the enterprise organization provides or locations the enterprise organizations are associated with. A manager may receive the recommendation and approve the recommendation to grant access to the applications and or permissions to the user.

Figure 4A:
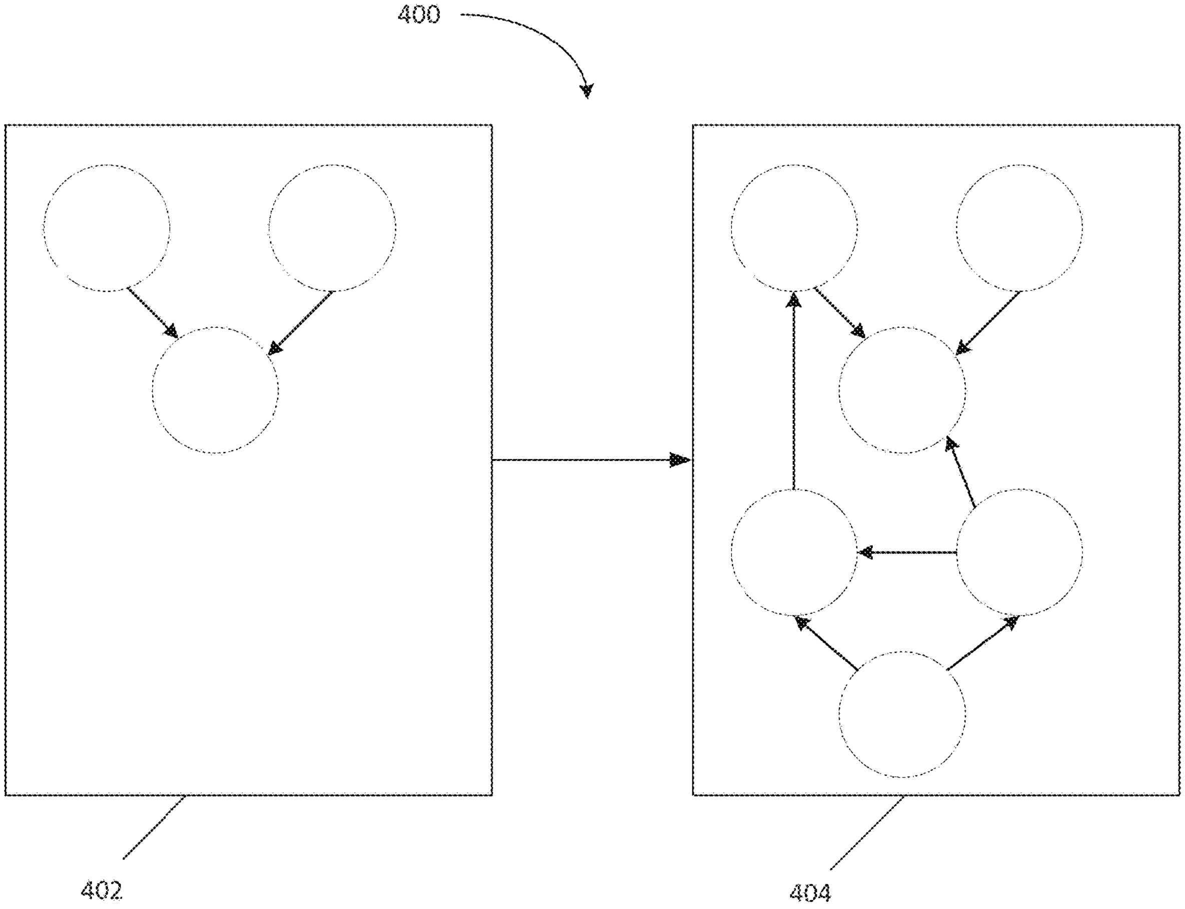
FIGS. 4A-D are depictions of an exemplary graph database updated based on generating new nodes and edges of the graph databases in accordance with one or more examples of the present application.
Figure 4B:
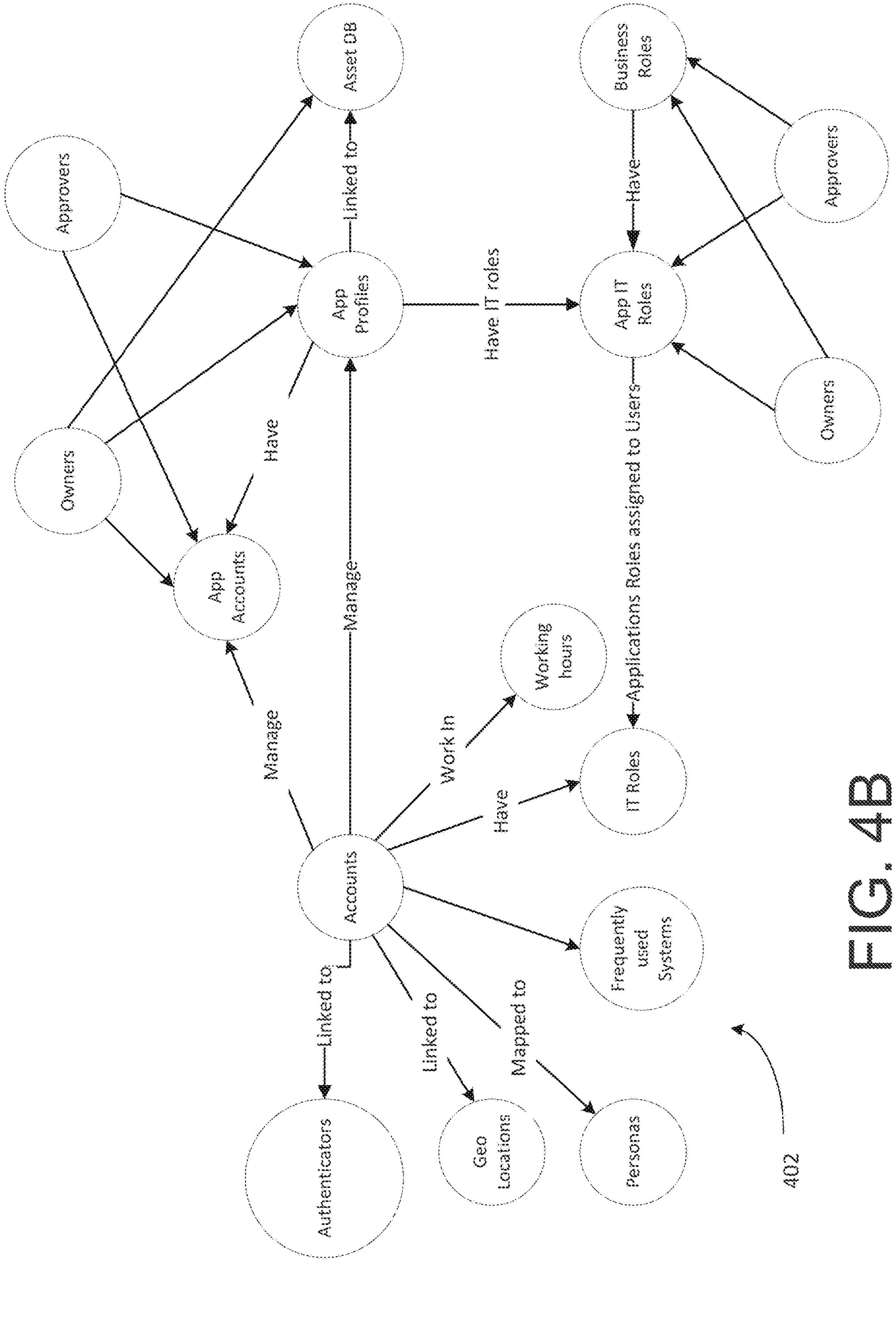
Figure 4C:
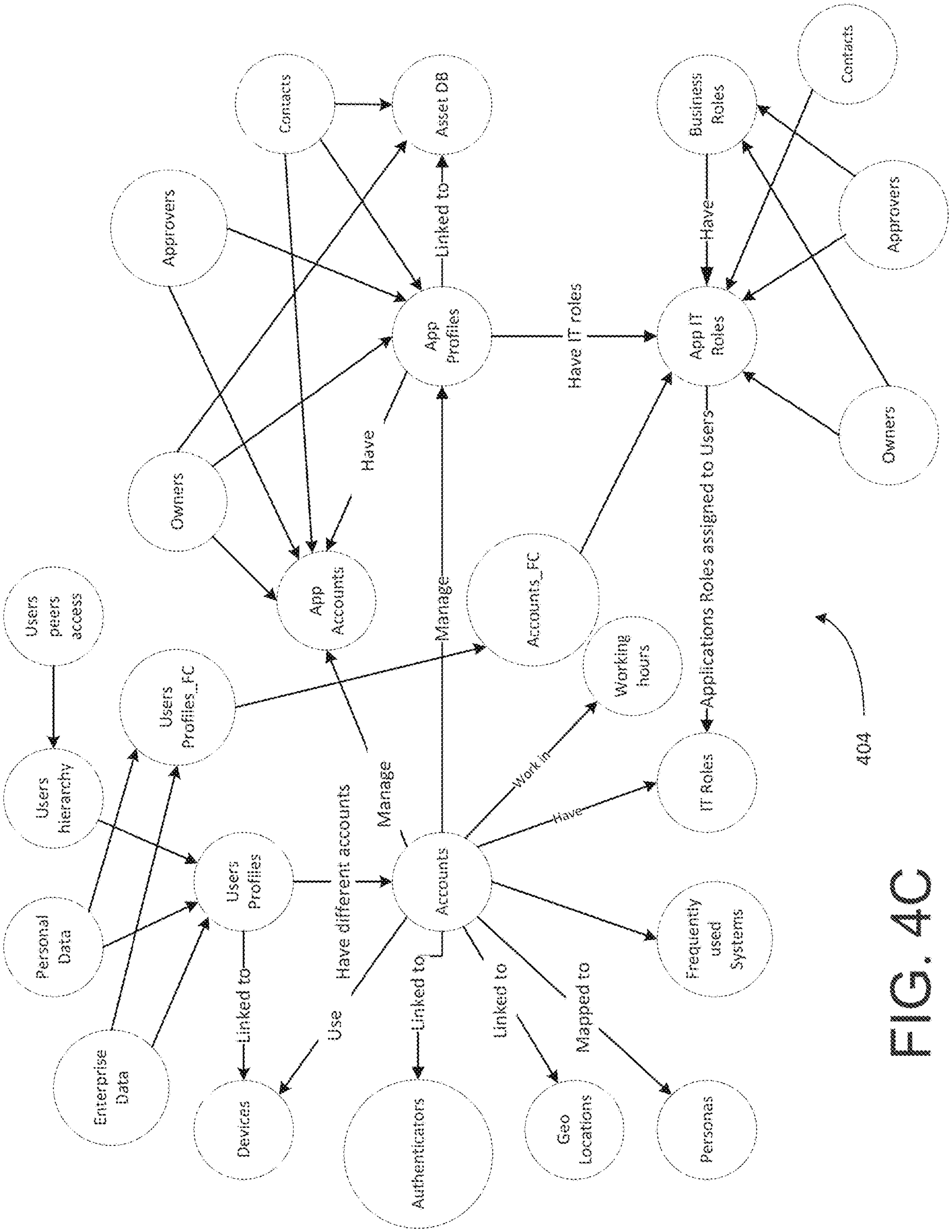
Figure 4D:
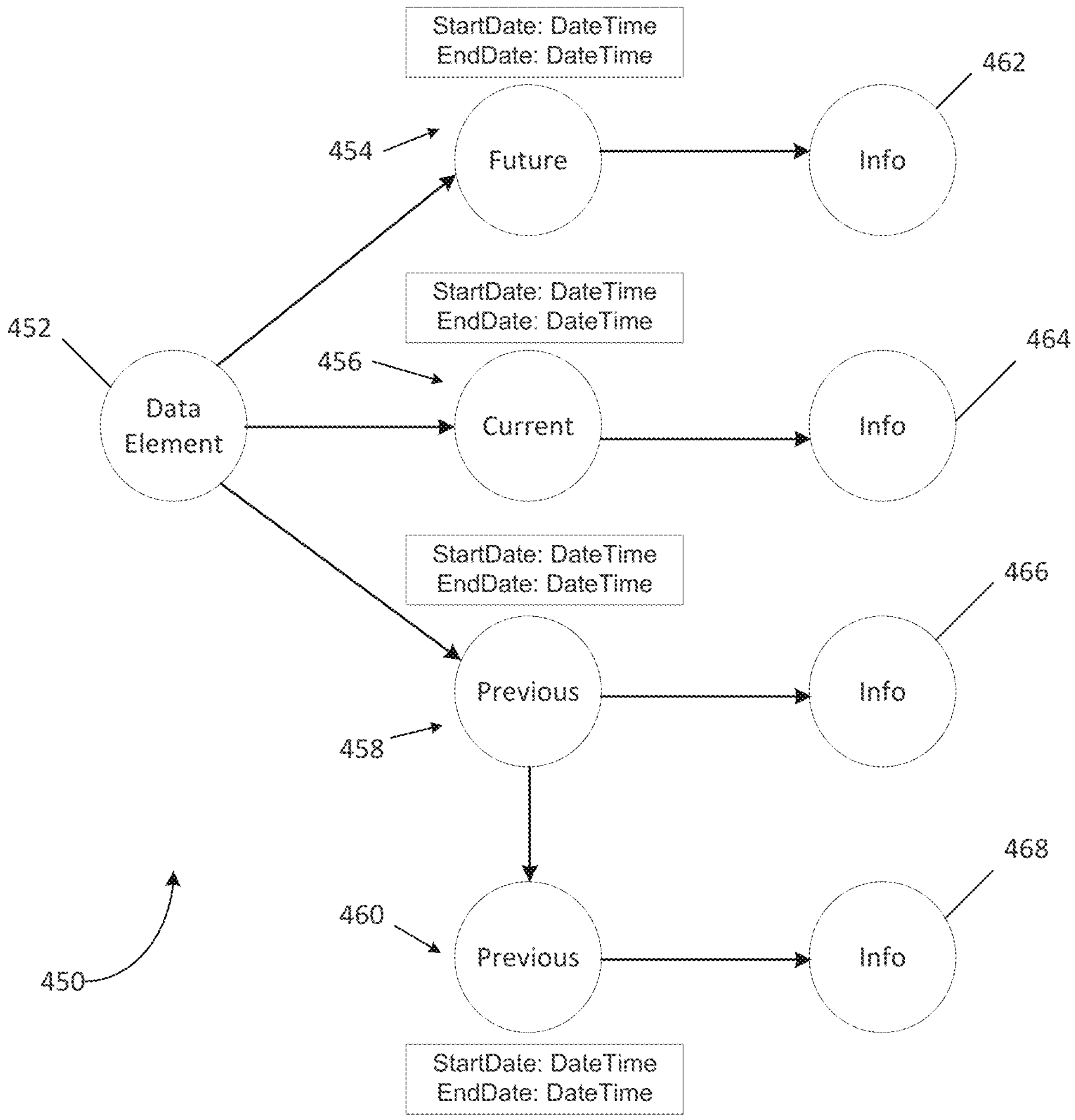

At block 302, the enterprise computing platform 108 updates a graph database is based on generating one or more new nodes and one or more new edges for the graph database, wherein the one or more new nodes and the one or more new edges are associated with onboarding information for a user. For example, FIGS. 4A-D are depictions of an exemplary graph database updated based on generating new nodes and edges of the graph databases in accordance with one or more examples of the present application. FIG. 4A is an example of a process 400 that updates the structure of graph database 402 into the structure of graph database 404 by adding new nodes and new edges. Those new nodes may be connected to the old nodes and/or the new nodes via edges. FIG. 4B provides an example of a graph database 402 of FIG. 4A, and FIG. 4C provides an example of a graph database 404 of FIG. 4A, such that an update process (e.g., process 400) may update graph database 402 of FIG. 4B into graph database 404 of FIG. 4C. FIG. 4D provides an example of how nodes may be generated when multiple nodes are generated for the same data element of a graph database 402 and/or 404.

As shown in FIG. 4A, a graph database 402 includes nodes and edges connecting those nodes. The existing nodes and edges of graph database 402 may be updated (e.g., by entities of the enterprise computing platform 108 such as a synchronization server 110, an IGA server 120, and/or the graph database 402) into graph database 404 by generating new nodes and new edges between the new nodes and/or the existing nodes. For example, the graph database 402 may receive data relating to onboarding information for a newly hired or reassigned user (e.g., from synchronization server 110 and/or IGA server 120) that may be used by the enterprise computing platform 108, alone or in combination with existing data in the graph database 402, to generate new nodes and edges. Additionally, and/or alternatively, the graph database 402 may receive a graph structure for the graph database 402 generated based on the new onboarding information for the user alone and/or in combination with other data already available to the enterprise organization.

Figure 9:
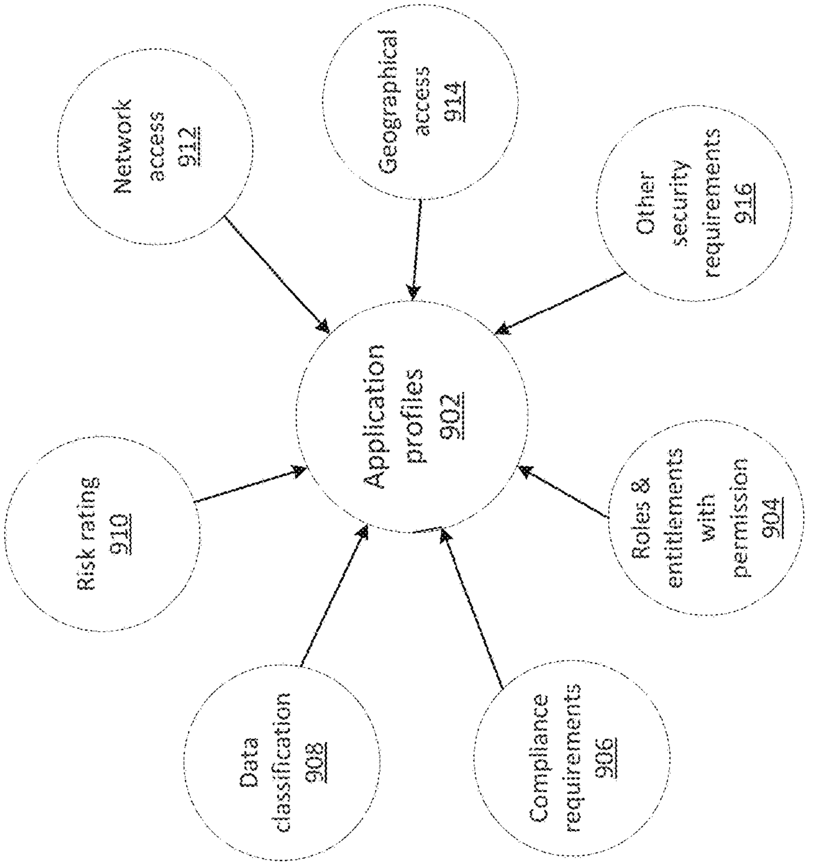
FIG. 9 is a depiction of an example application profile data element and data related to the example application profile data element in accordance with one or more examples of the present application.

For instance, as shown in FIG. 4B, the graph database 402 may include existing nodes relating to different categories of data (e.g., data elements). For example, FIG. 9 depicts an example of a data element 902 that relates to an application profile. The application profile may represent the managed data of an application, and may relate to (e.g., govern, affect, be affected by) different data regarding the use or access of the respective application. The application profile may include separate sets of data and/or policies, and the application profile may update and evolve as changes are made to each set of data and/or policies according to the application and data lifecycle management process. For instance, an application profile may be related to (e.g., include and/or be affected by) data 904 regarding the roles and entitlements with permissions of the users, and who may access the application and based on what conditions may affect the management of the data of a profile of the application.

The application profile data element may also be related to data 906 regarding the compliance requirements of different legal or software compliances. For instance, restrictions as to what information may be accessed by what people in order to comply with the health insurance portability and accountability act (HIPPA), the health information trust alliance (HITRUST), federal information processing standards (FIPS), etc., may affect the management or use of an application and/or the applications data. The application profile may also be related to data 908 regarding data classifications. For instance, how data is classified according to different categories and/or standards (e.g., personal identifiable information (PII), protected health information (PHI), payment card industry (PCI)) may also affect the management of the data of the application profile for many reasons, such as because different classifications of data have different standards of protection and/or processing, and/or because different categories of data are accessed differently by different applications. An application profile data element may also be related to data 910 regarding the risk rating of the application. For example, some applications may be assigned a higher risk (e.g., low, medium, high, critical) than other applications for many reasons, such as because one application may utilize more confidential information than other applications and/or because some applications have a greater potential for harming the functioning of the enterprise organization or a third party. An application profile data element may also be related to data 912 regarding network access policies for the application. For instance, the application may be granted different types of access to an enterprise organization network (e.g., may only access and/or communicate data internal to the organization, may communicate data external to the organization, may operate on a private network) for many reasons, such as to prevent data misuse and/or to preserve computing resources. An application profile data element may also be related to data 914 regarding geographical access policies. For instance, the application may restrict from which locations the application may be accessed and/or who may access the application based on a geographical location (e.g., a user in the USA may access the application while a user in India may not access the application) for many reasons, such as to comply with data restriction laws of a country and/or due to the application not being supported in different countries. An application profile data element may also be related to data 916 regarding other security requirements of the application. For example, the application may be subject to the access policies of a specific department (e.g., who governs the application and/or a department of the user who attempts to access the application) and/or specific user types and profiles.

These data elements may also include user accounts ("accounts"), authenticators for the user accounts ("authenticators"), geolocations related to accounts access ("geolocations"), personas, frequently used systems, application information technology (IT) roles ("app IT roles"), the working hours of a user account ("working hours"), applications accounts "app accounts"), the applications profiles (e.g., as described above) ("app profiles"), the asset databases ("asset DB"), account IT roles ("IT roles"), the business roles, and one or more approver and owner nodes (e.g., approvers and owners of application accounts and/or roles). The graph database 402 may capture the relations between these different nodes and the data elements of these nodes. For example, the user accounts node may have an edge to the working hours node (e.g., because the user accounts may work within certain working hours of the working hours data element). The user accounts node may have a node to the account IT roles node (e.g., because the user accounts may have IT roles associated with respective accounts). The user accounts node may have an edge to the frequently used systems node (e.g., because certain user accounts may use some systems frequently). The user accounts node may have an edge to the personas node (e.g., because the user accounts node may be mapped to a respective persona). The user accounts node may have an edge mapped to the geolocations node (e.g., because user may be linked to different and/or specific geolocations). The user accounts node may have an edge to the authenticators node (e.g., because the user accounts may be linked to the different and/or specific authenticators). The user accounts node may also have edges to the application accounts and application profiles nodes (e.g., because the user accounts may manage the data of those nodes). The app IT roles nodes may have an edge to the user IT roles nodes (e.g., because applications roles may be assigned to users). The app profiles node may have an edge to the asset DB node (e.g., because an application profiles is linked to an asset in the asset database). The app profiles node may have an edge to the app IT roles node (e.g., because the application profiles may have IT roles). The business roles nodes may have an edge to the app IT roles (e.g., because the business roles may application IT roles). The approvers and owners may have edges to those node which they respectively manage (e.g., app IT roles, business roles, app profiles, app accounts, and/or asset DB). In some variations, relate to information of the enterprise organization and might not include the onboarding information of the user. The graph database 402 may also include existing edges between these existing nodes relating to how the existing nodes are interrelated (e.g., the accounts may manage the applications profiles, therefore an edge may connect (e.g., relate) the accounts node to the applications profiles node). The nodes and edges of graph database 402 and/or 404 are merely exemplary, and the graph database 402 and/or 404 may include additional and/or alternative nodes and edges, and/or different data elements of those nodes.

As shown in FIG. 4C, the enterprise computing platform 108 (e.g., by a synchronization server 110 and/or IGA server 120) may generate new nodes and edges for the graph database 402, and the graph database 402 may receive these new nodes and edges, such that graph database 402 may still include the existing nodes and edges and be updated to (e.g., become) graph database 404. For example, the graph database 402 may be updated with new nodes such as a user's profiles node, a user's profiles forecasted node (e.g., forecasted changes in the users profiles), a user devices node ("devices"), an enterprise data node, a personal data node (e.g., personal data of the onboarded user), a user hierarchy node (e.g., the hierarchy including the onboarded user), a users peers access node (e.g., the access that the onboarded user's peers have), an accounts forecasted node, and contact nodes for the application profiles and IT roles nodes. The graph database 404 may capture the relations between the different nodes and the data elements of these nodes. The users profiles node may have an edge to the user accounts node (e.g., because the users profiles may have different accounts). The user profiles node may have an edge to the user devices node (e.g., because the users profiles may be linked to the user devices that may support those users profiles). The accounts node may have an edge to the user devices node (e.g., because the accounts use and/or are supported by the user devices). The enterprise data, personal data, and users hierarchy nodes may all have edges to the users profiles node and the users profiles_FC node. The users profiles_FC node may have an edge to the accounts_FC node, which may in turn have an edge to the app IT roles node. The users peers access node may have an edge to the users hierarchy node.

These newly generated nodes and edges may be based directly on the onboarding information for the user received by the graph database 402 (e.g., users profiles, personal data, contacts, devices associated with the user). For example, the updated graph database 404 may include new nodes 'users profiles' and 'devices' generated based on the onboarding information for the user (e.g., because they are newly available categories of data relating to the new users profiles and what devices the new user will be associated and/or linked with). The graph database 404 may also include new edges between the new nodes (e.g., an edge from users profiles to devices) and new edges between the new nodes and the existing nodes (e.g., an edge from users profiles to accounts, and an edge from accounts to devices). The new nodes and edges of graph database 404 may therefore be integrated into the existing structure of graph database 402.

The graph database 404 may be updated in different ways. For instance, a user of an application may access an enterprise organization system and request access to the application. The enterprise computing platform 108 may retrieve (e.g., obtain) and/or receive data from multiple different sources related to the enterprise organization and related to specific applications, such as an HR department database (e.g., personal data on employees of the enterprise organization) and an application database related to the user request (e.g., an application database for the specific application for which access is requested) including application accounts (e.g., a governed, non-human account tied to application and used by the application). The application data may consist of the risk rating (low, med, high, critical), data classification (PII, PHI, PCI, etc.), geographical locations for access, network access, and/or other requirements. The enterprise computing platform 108 may then initialize and/or onboard the application and manage the data of the application. This obtained data may be used by the enterprise computing platform 108 to generate, update, and/or contribute to the nodes of the graph database 404. As a result, the graph database 404 may be updated in response to a user request. Additionally, and/or alternatively, the system may be used on a frequent or regular basis (e.g., daily) by a user 102 and/or the enterprise computing platform 108. The enterprise computing platform 108 may use the information resulting from that use (e.g., any authentications to any application, how they are accessed, which devices use the application, geolocation from which access is requested, time of request) to generate, update, and/or contribute to the nodes of the graph database 404, in addition to any regular synchronization with other sources, e.g., an HR department database and an application database. Moreover, these updates may occur at regularly scheduled intervals (e.g., daily). As a result, the graph database 404 may be updated automatically, without requiring a user request for access.

The enterprise computing platform 108 may also generate the new nodes and edges as a forecasting based on the onboarding information for the user. For instance, the new nodes 'users profiles FC' and 'accounts_FC' correspond to data regarding forecasted future changes to the users profiles and forecasted future changes to the accounts data, respectively. New edges may then be generated between these two nodes and/or from these new nodes to existing nodes (e.g., a new edge from accounts_FC to application IT roles). For example, if the onboarded user is required to complete training or further onboarding, or is hired on a probationary period that becomes a full time position in 6 months, the permissions and access policies for the user's accounts and user's profiles may be expected to adapt and/or expand. For another example, a forecasted hierarchy node associated with an organizational hierarchy (e.g., who manages who, who works in what department) may be generated to account for a situation where the user is currently onboarded but will not officially start until a later date. In this case, no current nodes may require updating, but may require updating at a known later date (e.g., the users start date) to include the user in the organizational hierarchy. The enterprise computing platform 108 may generate new nodes and new edges that reflect those expected changes. The graph database 402 and/or 404 may thereby include data (e.g., nodes and edges) that reflect current, past, and/or future versions of the same node.

As shown in FIG. 4C, the enterprise computing platform 108 may dynamically update the graph database 402 to graph database 404 by generating new nodes and edges, wherein the new nodes reflect updates to existing nodes. As shown in FIG. 4D, a particular data element may be included in one of these nodes from FIG. 4C (e.g., a user hierarchy could have a data element from FIG. 4D that is updated to include the new onboarded user in the hierarchy). A data element 452 (e.g., data associated with users profiles) of a graph database may be associated with one or more nodes (e.g., nodes 454, 456, 458, 460). Each of the one or more nodes may be associated with a timestamp indicating a start date by a date and/or time and/or an end date by a date and/or time. For example, for data (e.g., information ("info") 464) that currently represents the user's profiles, node 456 (e.g., a current node) may be assigned to info 464 with or without a timestamp to the time period in which the current permissions have applied and/or will apply. For data (e.g., info 466) that does not currently represent the user's profiles, but did apply in the past immediately before the info 464, node 458 (e.g., a previous node) may be assigned to info 466 and a timestamp may be assigned indicating the start and/or end date and/or time for which the data applied to the user's profile. For data (e.g., info 468) that represented the user's profiles before info 466, node 460 (e.g., another previous node) may be assigned and a timestamp may be similarly assigned. For data (e.g., info 462) that is forecasted to apply to the user's profiles, but does not currently apply, node 454 (e.g., a future changes node) may be assigned and a timestamp may be assigned with a forecasted start data and/or end date for when info 462 applies.

As shown in FIGS. 4A-C, graph database 402 and/or 404 may include each of these nodes 454, 456, 458, and/or 460 as separate nodes (e.g., accounts and accounts_FC) and/or may include each of nodes 454, 456, 458, and/or 460 as sub-nodes (e.g., versions) of a node representing a data element 452 as a whole (e.g., node 'frequently used systems' may include sub-nodes representing the frequently used systems at different times). Additionally, and/or alternatively, a node of graph database 402 may be replaced when updating to graph database 404 by a newer version of the same node (e.g., node 456 is replaced with node 454). Advantageously, when previous versions of a data element 452 are retained by the graph database (e.g. previous manager, title, rolls, and/or requirements), a history of past permissions may be relied upon for recommending user application permissions in addition to compliance and review.

Additionally, and/or alternatively, upon info 462 applying to the user's profile, the future node 454 may become a current node, and current node 456 may become another previous node. This process may occur automatically (e.g., in response to an action by the user and/or enterprise organization) or at a predetermined time (e.g., when access is given for a defined period of time). When one or more of the nodes are assigned timestamps, the process of updating nodes 454, 456, 458, and 460 may occur based on a schedule (e.g., a predetermined time) of the timestamps. For instance, node 456 may be associated with the timestamp 'EndDate: Aug. 30, 2023_24:00,' and node 454 may be associated with the timestamp 'StartDate: Aug. 31, 2023_00:00.' Upon the change from August 30 to August 31, the enterprise computing platform 108 may apply the info 462 (e.g., settings, permissions, entitlements, accesses) to the data element 452 (e.g., the user's profiles), and the node 454 may become the current node for data element 452, while node 456 becomes a previous node for data element 452. As a result, a specific date and time may enable and/or disable a conditional state of nodes (e.g., nodes 454, 456). Additionally, and/or alternatively, a conditional state of a node may be enabled and/or disabled by other conditions, e.g., an affiliated IP address. For example, node 456 may be the current node for data element 452 while a device used to access an application is affiliated with a specified IP address. Upon a change in affiliated IP address, node 456 may become a previous node for data element 452, while node 454 becomes the current node for data element 452.

Additionally, and/or alternatively, the end date of the timestamp of each current node may be unassigned until the end date is reached and a new node is generated. For example, node 456 may represent the info 464 that currently applies to data element 452 (e.g., devices currently associated with the user). A timestamp may be assigned a start date beginning on the date and/or time that info 464 applied, while no end date may be explicitly assigned. Upon synchronizing the graph database to represent an up-to-date snapshot of the data element 452 and/or the enterprise organization as a whole (e.g., every 24 hours, every month, every software update), a new node (e.g., node 454) may be generated as the current node, an end date may be assigned to node 456, and node 456 may become a previous node.

At block 304, the enterprise computing platform 108 extracts graph data for the user from the updated graph database. For example, the enterprise computing platform 108 may use an analytics process (e.g., process 500 of FIGS. 5A-5B) to process (e.g., review, scan, receive as input) the updated graph database. The analytics process may output data extracted from the updated graph database. For instance, an analytics process may process the updated graph for different categories of data (e.g., information). By processing the updated graph database, the analytics process may output the provided data itself (e.g., data of the nodes) in addition to relevant connections (e.g., edges) between the informational nodes of the provided data and past or potential information (e.g., from previous or forecasted entitlements (e.g., permissions).

Figure 5A:
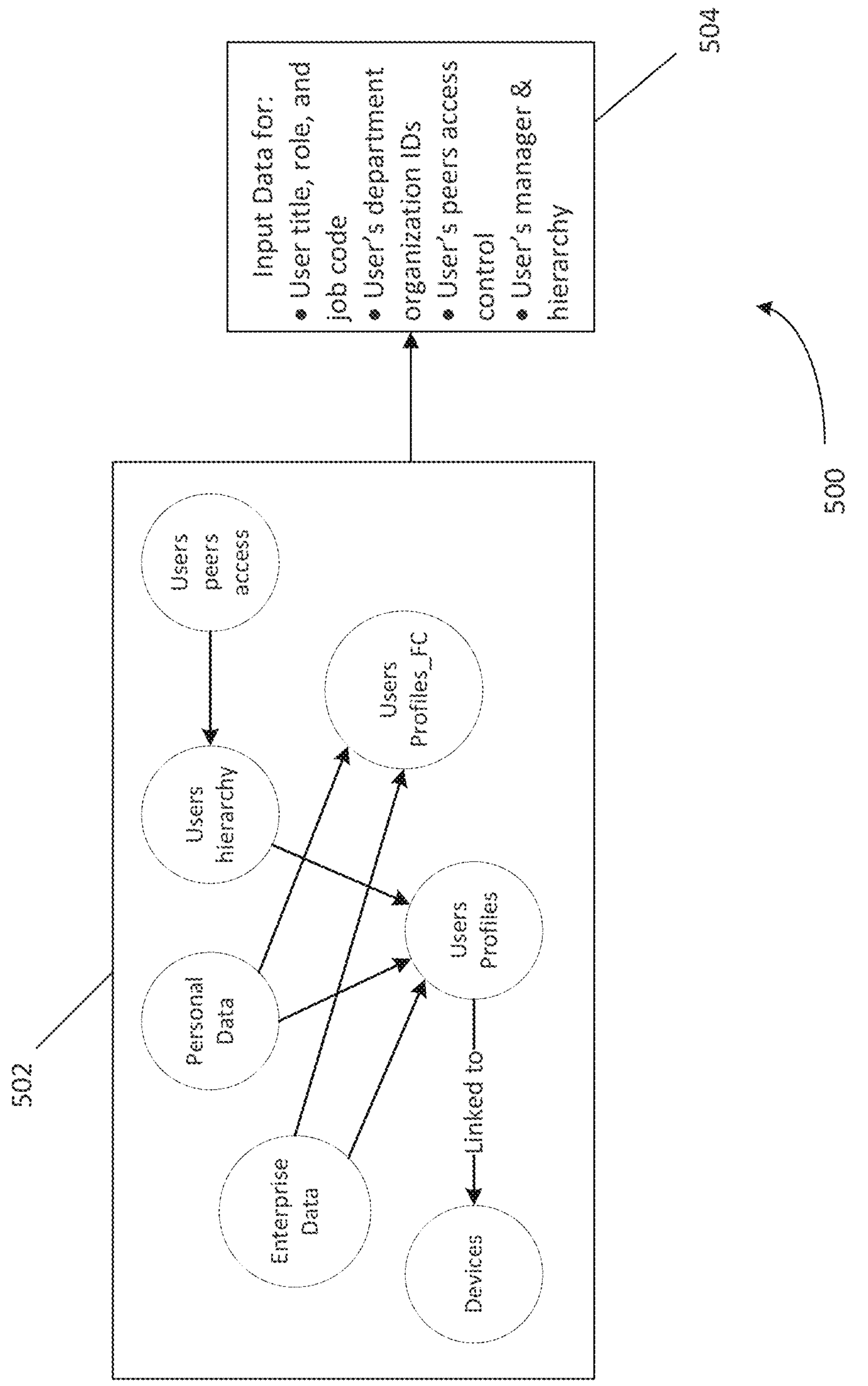
FIGS. 5A-C depict an exemplary process for updating a graph database based on generating new nodes and edges of the graph database in accordance with one or more examples of the present application.

For instance, as shown in FIG. 5A, processing the updated graph database and/or relevant portions of the updated graph database (e.g., graphs 502, 508) may yield different categories of data. For example, graph 502 may include data related to a user and provided in response to the user being onboarded (e.g., user's personal data, associated devices, user's hierarchy and peers' access (where the peers cannot be determined before the person is onboarded)). As a result, processing graph 502 may yield (e.g., output), for example, dynamic and updated extracted graph data 504 relevant to a user's: title, role, and/or job code; department and/or organizations IDs; peer's permissions and/or access control; and manager and/or hierarchy. This extracted graph data 504 of the analytics process may be provided and/or prepared for input into one or more subsequent ML-AI models 510.

Figure 5B:
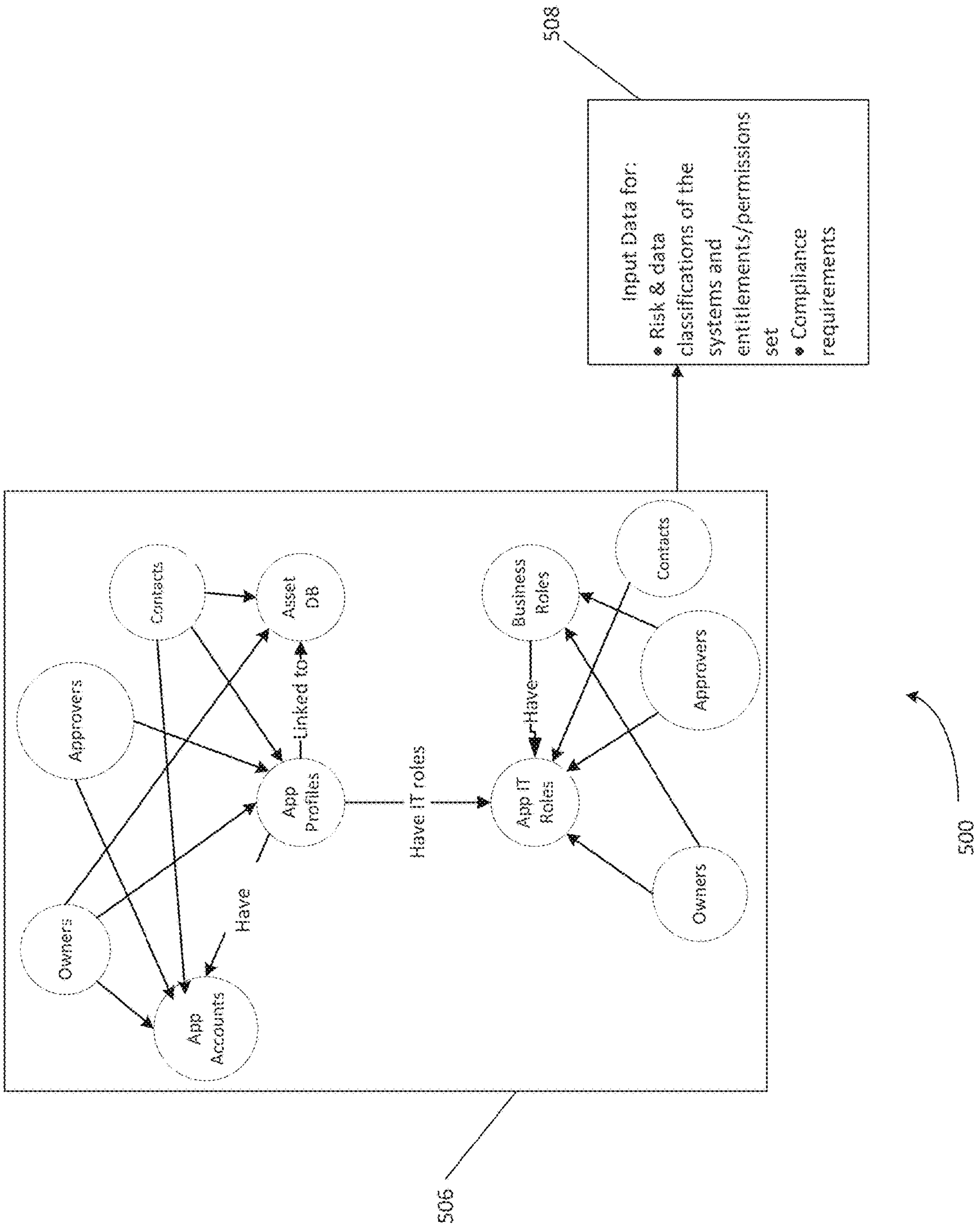

As shown in FIG. 5B, graph 508 may contain, for example, data related to the enterprise organization and available to the enterprise organization (e.g., applications profiles, asset databases, approvers of applications profiles). For instance, graph 508 may contain an asset database, which may be provided by a centralized asset database. The enterprise computing platform 108 may register every application in the asset database, such that when reviewing a profile, business managers and developers may go through the applications of the profile and provide details in the asset database (e.g., relevant for certain IT roles, business roles, length of employment) which can be used to inform later decisions whether to grant or deny access to an asset and/or application. As a result, processing graph 508 may yield categories of extracted graph data 508 relevant to: risk and data classifications of the systems and/or entitlements (e.g., permissions) set; and compliance requirements (e.g., health insurance portability and accountability act (HIPAA)). This extracted graph data 508 of the analytics process may be provided and/or prepared for input into one or more subsequent ML-AI models 510.

Additionally, and/or alternatively, extracting the extracted graph data may include extracting a first portion of the extracted graph data including a user title, a user role, a user job code, a user department, a user identification, access controls of a peer of the user, a user manager, and/or a hierarchy of the user. A second portion of the extracted graph data may be extracted including a system risk classification, a permissions risk classification, a system data classification, a permissions data classification, and/or a compliance requirement.

Additionally, and/or alternatively, when the updated graph database includes one or more new nodes and one or more new edges, graph data may be extracted from the one or more new nodes, the one or more new edges, the one or more further new nodes, and the one or more further new edges for the graph database.

At block 306, the enterprise computing platform 108 may input at least a portion of the extracted graph data for the user into one or more ML-AI models to obtain one or more recommended user applications. For instance, as shown in process 500 of FIG. 5C, one or first ML-AI models 510 may receive as input the extracted graph data 504. The one or more first ML-AI models may output a recommendation 514. Recommendations 514 may include one or more recommended applications for the user, and/or one or more permissions for the one or more recommended applications of the recommendations 514. Recommendations 514 may also include additional description regarding why the application or permissions have been recommended to help a manger decide whether to accept the recommendations 514. For example, the recommendations 514 may include that the recommended applications or permissions are based on the security space of the user, the duration the user has been with the enterprise organization, information regarding the history of the applications and permissions granted by the enterprise organization, and/or the user's personal information.

Additionally, and/or alternatively, a first portion of the extracted graph data for the user may be input into one or more first ML-AI models to obtain a plurality of intermediate recommended user applications, and the one or more recommended user applications may be determined based on inputting a second portion of the extracted graph data for the user and the plurality of intermediate recommended user applications into one or more second ML-AI models. For example, one or first ML-AI models 510 may receive as input the extracted graph data 504 and output (e.g., an intermediate recommendation including a list of 10 recommended applications and/or permissions) that is received by one or more second ML-AI models 512. The one or more second ML-AI models 514 may also receive extracted graph data 508, and based on the output of the one or more first ML-AI models 510 and the extracted graph data 508, the one or more second ML-AI models 514 may output recommendations 514 (e.g., a final recommendation including a list of 4 recommended applications and/or permissions). The recommendations 514 may include one or more recommended applications for the user, and/or one or more permissions for the one or more recommended applications of the recommendations 514. Recommendations 514 may also include additional description regarding why the application or permissions have been recommended to help a manger decide whether to accept the recommendations 514. For example the recommendations 514 may include that the recommended applications or permissions are based on the security space of the user, the duration the user has been with the enterprise organization, information regarding the history of the applications and permissions granted by the enterprise organization, and/or the user's personal information.

Figure 5C:
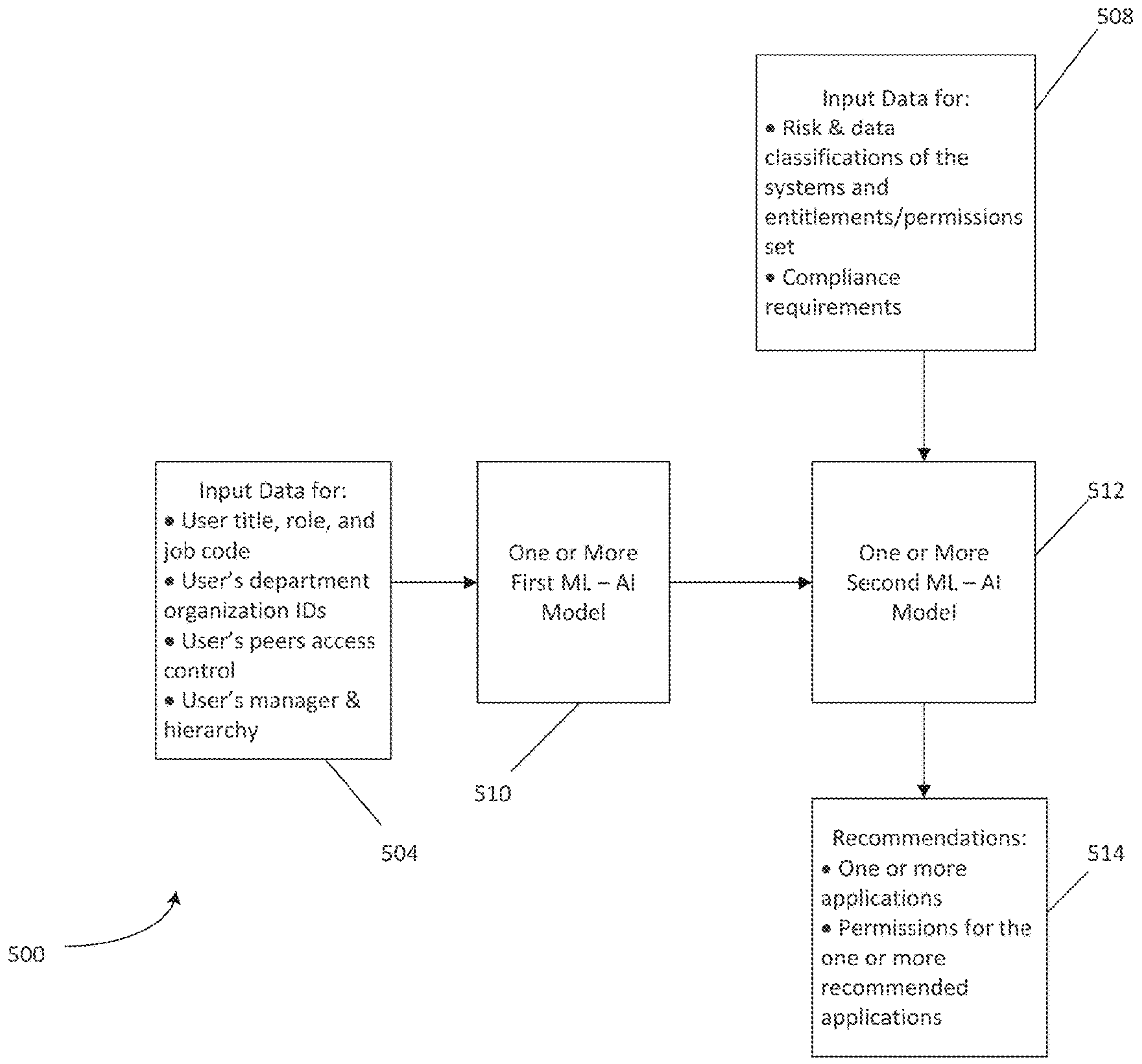

Additionally, and/or alternatively, the second portion of the extracted graph data for the user and the plurality of intermediate recommended user applications may be input into the one or more second ML-AI models to determine one or more user permissions, and the one or more recommended user applications may be determined based on the one or more user permissions and the plurality of intermediate recommended user applications. For example, as shown in FIG. 5C, the one or more first ML-AI models 510 may receive as input 504 and the one or more second ML-AI models 512 may receive as input 508. The input 504 may be different from the input 508 (e.g., the input 504 may include different categories of data from the input 508). The one or more first ML-AI models may use, as input, information more closely related to the user (e.g., user title, role, job code, department ID, peers' access, manager and/or hierarchy) to output one or more intermediate recommendations. The one or more second ML-AI models 512 may then receive, as inputs, the one or more intermediate recommendations output by the one or more first ML-AI models 510 and the input data 508 to determine, and output, the one or more recommended user applications.

Additionally, and/or alternatively, a single ML-AI model may receive both categories of extracted graph data 504 and 508. The single ML-AI model may receive the extracted graph data 504 and 508 sequentially and process the data 504 and 508 sequentially. For example, the single ML-AI model may receive extracted graph data 504, produce a first output based on the extracted graph data 504, then receive the extracted graph data 508, and produce a second output (e.g., recommendations 514) based on the extracted graph data 508 and the first output. A single ML-AI model may also receive extracted graph data 504 and 508 sequentially or simultaneously and process extracted graph data 504 and 508 simultaneously to obtain (e.g., produce, determine) recommendations 514.

At block 308, the enterprise computing platform 108 may cause display of the one or more recommended user applications on a display device. For example, a display device may display, to a manger, the user recommendations based on or including the recommendations 514. The manager of the user may review the recommendations displayed on the display device and decide whether the recommended applications and/or permissions are appropriate for the user based on the user (e.g., the user's role, title, time of employment, personal data).

At block 310, the enterprise computing platform 108 may receive user input indicating approval for granting access to at least one recommended user application from the one or more recommended user applications. For instance, the manager of the user may approve the displayed recommendations. Alternatively, the manager of the user may approve parts of the recommendations (e.g., one or more of the recommended applications and/or permissions) and deny the remainder of the recommendations. The manager of the user may also deny the recommendation entirely, and request a new recommendation from the one or more ML-AI models.

At block 312, the enterprise computing platform 108 may provide instructions to direct a second computing platform to grant access to the at least one recommended user application. For example, when input from the manager of the user is received, the approval may be sent to a second computing platform that governs permissions (e.g., entitlements and/or permissions). The second computing platform may receive the approval and grant (e.g., provide) access (e.g., to the user, user profile, user account, user device) according to the received approval for the one or more recommended user applications and/or permissions. Additionally, and/or alternatively, instructions may be provided (e.g., by the enterprise computing platform 108) directing the second computing platform to restrict access by the user to the one or more updated recommended user applications for the user, and/or may grant some recommended permissions and deny others.

Additionally, and/or alternatively, the one or more ML-AI models may be trained by the enterprise computing platform. For instance, the enterprise computing platform 108 may store in memory one or more recommendations (e.g., recommendations associated with the obtained recommended user applications) output by the one or more ML-AI models. The enterprise computing platform 108 may one or more ML-AI models may be trained based on the stored one or more recommendations and the user input indicating approval for granting access to at least one recommended user application. The enterprise computing platform 108 may then store the trained one or more ML-AI models in memory, and inputting at least the portion of the extracted graph data for the user into the one or more ML-AI models may also include retrieving the trained one or more ML-AI models from memory. For example, the enterprise computing platform 108 may update the graph database often (e.g., everyday and/or every time a user makes a request) and the graph database may therefore change often. The enterprise computing platform 108 may continuously track the graph database as it updates (e.g., changes) and may archive different graph structures of the graph database and/or archive different versions of the graph database in memory. For example, the enterprise computing platform 108 may take a daily 'snapshot' of the graph database and archive that snapshot in memory. Over time, an archive of previous graph databases may be formed. The enterprise computing platform 108 may store the outputs of one or more ML-AL models (e.g., recommendations) in memory (e.g., specific recommendations, every recommendation, every third recommendation to conserve memory and computing resources). The enterprise computing platform 108 may perform a comparison based on changes in the graph database to determine whether their recommendations were accurate, and whether any weights or operating variables should be adjusted to improve the accuracy of the recommendations. For example, in an unsupervised learning environment, the enterprise computing platform 108 may store the outcomes of the ML-AI models (e.g., what apps are recommended by the models) in memory. Then, the graph may reflect what applications that the user is actually granted access to. Based upon these (e.g., what the user is granted access to versus what the outcomes from the model are, which may be different based on supervisor user inputs and so on), the enterprise computing platform 108 may train the models.

Additionally, and/or alternatively, the enterprise computing platform may store one or more recommendations (e.g., recommendations are associated with the obtained recommended user applications) output by the one or more ML-AI models. The one or one or more ML-AI models may also be trained based on the one or more recommendations and the user input indicating approval for granting access to at least one recommended user application. The one or more trained ML-AI models may then be stored in memory, and wherein inputting at least the portion of the extracted graph data for the user into the one or more ML-AI models further includes retrieving the trained one or more ML-AI models from memory. For instance, the one or more ML-AI models may store and/or receive the user input approving or denying the permissions and/or applications recommended by the one or more ML-AI models. By comparing this received user input with the corresponding recommendation, the one or more ML-AI models may be trained in response to user requests for access (e.g., during an onboarding process).

Recommended user permissions and applications may also be obtained after onboarding is completed and/or during the normal course of employment (e.g., dynamic access review six months after onboarding). For example, the graph database may be updated to include data relevant to user permissions acquired after onboarding (e.g., a specific action such as a user role change or a change in a peer's access policies or a daily update of the data in the graph database) while also archiving the previous data. This updated graph database may then include multiple sub-nodes for a single data element (e.g., sub-nodes 454, 456, 458, 460 for data element 452 of FIG. 4D). Based on these updated sub-nodes which now include previous nodes for data element 452 (e.g., previous data elements), the additional extracted graph data may then include historical data and/or forecasted data for the one or more ML-AI models to use as an input for determining one or more recommended user applications and/or permissions.

For instance, an enterprise organization may perform periodic reviews of user permissions. The enterprise computing platform 108 may update an existing graph database with the current data available to the enterprise computing platform 108 (e.g., synchronize the graph database 118 with data from the synchronization server 110 and IGA server 120). The new data may be related to any category of data element, and may, but does not necessarily need to, include data related to the user. New nodes may also be generated for the updated graph database (e.g., graph database 404 of FIG. 4C) with additional edges between those new nodes and/or the existing nodes.

The enterprise computing platform 108 may then extract graph data from the updated graph database. This extract graph data may be input to one or more ML-AI models (the same or different ML-AI models used for onboarding), which may output one or recommended user applications. Therefore, the one or more ML-AI models may provide one or more recommended user applications based on extracted graph data extracted from the historical data available to the enterprise computing system, allowing for changes over time to be considered and reflected in the extracted graph data. The one or more ML-AI models may also provide one or more recommended user applications based on extracted graph data extracted from onboarding process (e.g., age of the user, actual or intended usage of applications, indirect mapping of nodes performed by one or more other ML-AI models) alone or combination with the extracted graph data extracted from the historical data available to the enterprise computing system. These recommended user applications may be compared to current user applications and permissions of the user to determine whether changes should be made to the user's permissions. For example, the enterprise computing platform 108 may cause display of a recommended adjustment of user permissions for review (e.g., by a manager of the user) when the user's current permissions differ from the output one or more recommendations.

Figure 6:
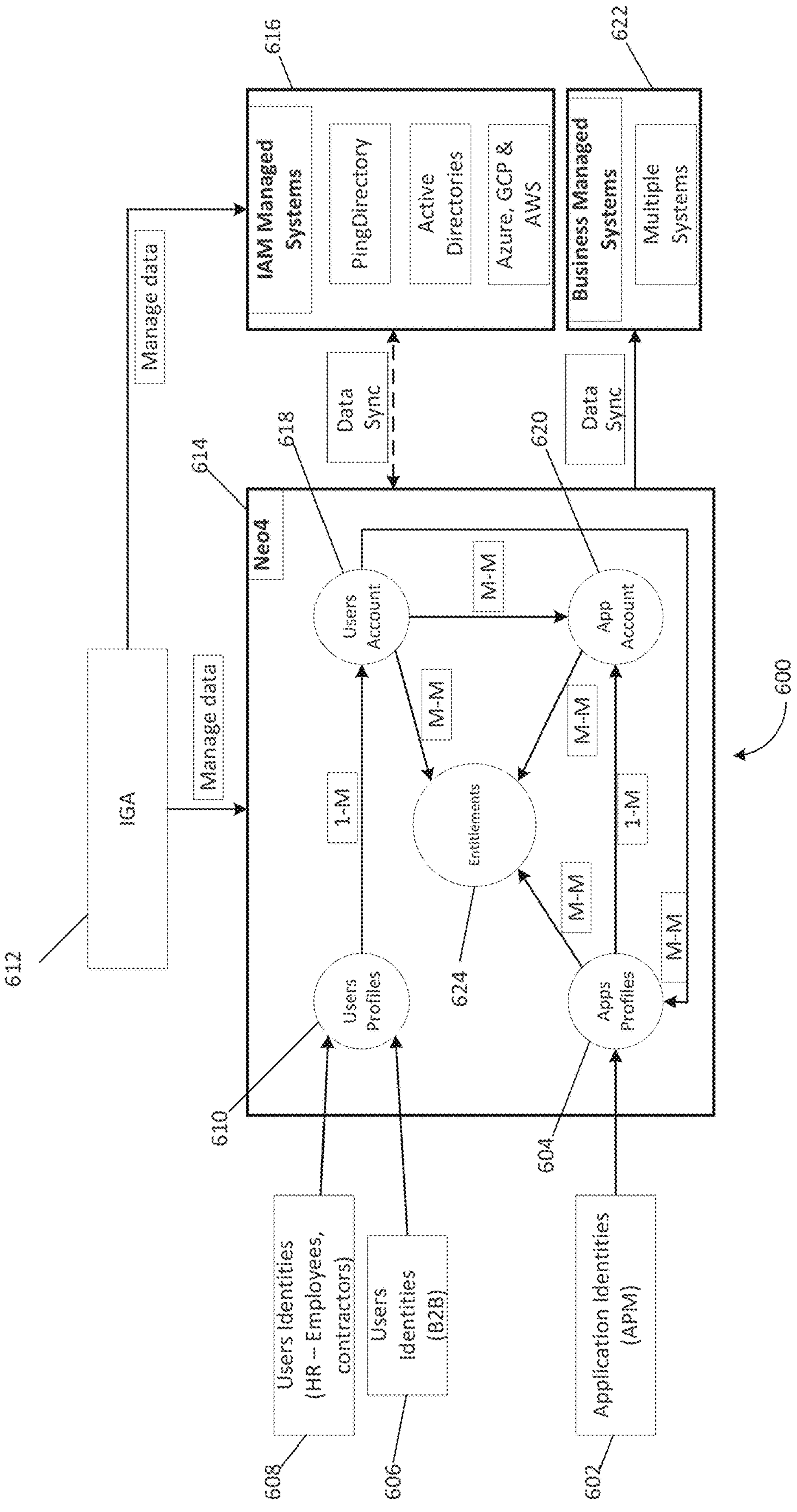
FIG. 6 is a depiction of an exemplary process for generating and/or updating a graph database from different managed systems and identities in accordance with one or more examples of the present application.

FIG. 6 provides an example system 600 for managing data of a graph database 614 with an IGA server 612. The IGA server may communicate with the graph database 614 and identity and access management (IAM) managed systems 614, and via these communications, may manage the data of the graph database 614 and systems 616. The graph database 614 may receive data regarding different identities for generating and/or updating the graph database 614. For instance, the graph database 614 may receive data regarding application identities 602, and use this received data 602 to inform an applications profiles node 604, which is related to an applications accounts node 620 and to an entitlements node 624 (e.g., an edge runs from node 604 to 620 and from node 604 to 624). The graph database 614 may also receive data regarding users identities (e.g., HR data of employees and/or contractors) 608 and users identities (e.g., regarding business to business (B2B) commerce and/or communication) 606. The received data 608 and 606 may be used to generate and/or update a user's profiles node 610, which is related to a user's accounts node 618 (e.g., an edge runs from node 610 to 614). The graph database 614 may also relate (e.g., using an edge) an application accounts node 620 and a user's accounts node 618 to the entitlement node 624, and the users accounts node 618 to the applications profiles node 604 and applications accounts node 620. Each relation may be a 1-M relation, i.e., a single relation to many relations (e.g., one node to another node including multiple data elements), or an M-M relation, i.e., many relations to many relations (e.g., one node to multiple other nodes or a relation of multiple nodes to multiple other nodes) The graph database 614 may also synchronize with the IAM managed systems 614 and multiple systems of the business (enterprise organization) managed systems 622. For example, the business managed systems 622 and request and/or receive data from the graph database 614, which may allow for the graph database 614 to synchronize the business managed systems 622. Additionally, when data is affected (e.g., updated) in one or more of the business managed systems 622, the graph database 614 may receive the updated data and thereby synchronize with the business managed systems 622. Similarly, each application of the IAM managed systems 616 may be in communication with an application programming interface (API) gateway. The API gateway may provide a single interface for each application, and act as a middleman between the applications of the IAM managed systems 616 and the graph database 614. The enterprise organization of the IAM managed systems 616 may enable the API gateway to synchronize with the graph database 614, thereby enabling the API gateway to synchronize the data between the graph database 614 and the IAM managed systems 616 with a single interface.

Figure 7:
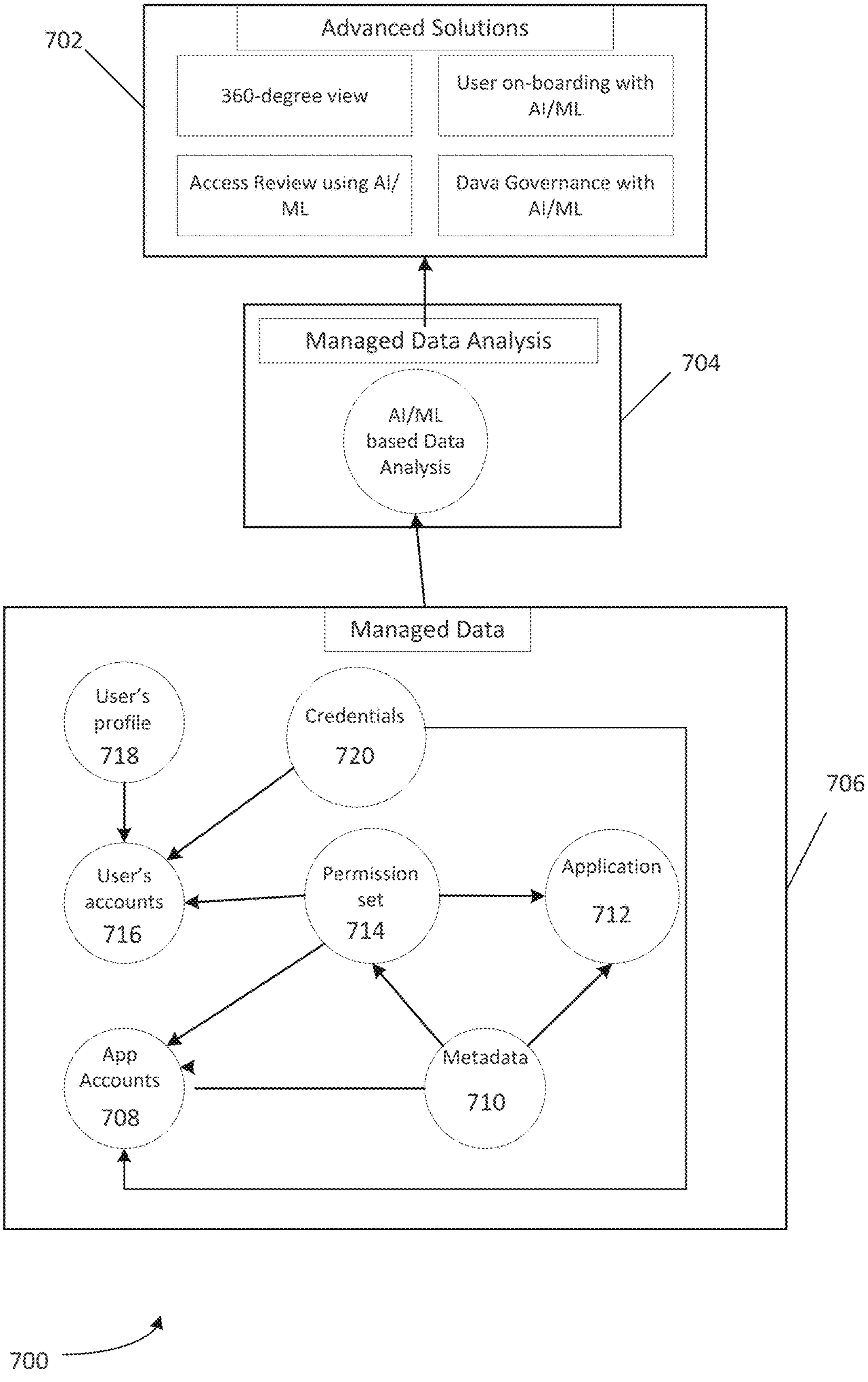
FIG. 7 is a depiction of an exemplary process for providing permissions solutions using a graph database in accordance with one or more examples of the present application.

FIG. 7 provides an example system 700 for managing data of a graph database 706. As shown, the graph database 706 may include one or more nodes and edges relating information regarding applications, permissions, enterprise organization data, and a user's profile. A managed data analysis 704 may be performed by one or more ML-AI models to provide advanced solutions 702 (e.g., one or more ML-AI models of the analytics server 116). The output of the one or more ML-AI models of the managed data analysis 704 may be utilized as an input by one or more ML-AI models of the advanced solutions 702 to provide a respective output. Additionally, and/or alternatively, based on the same extracted graph data of graph database 706, the one or more ML-AI models may provide multiple different advanced solutions 702. The advanced solutions 702 may include a 360 degree view (e.g., provide all relevant information) of the applications and permissions for a user, and one or more processes that may utilize or include ML-AI models, such as user on-boarding, access review, and data governance.

Each of the one or more ML-AI models of the advanced solutions 702, and the one or more ML-AI models of the managed data analysis 704, may be trained using the output of the managed data analysis. Additionally, and/or alternatively, a subset of the nodes of the graph structure 706 may be used to train the one or more ML-AI models of the advanced solutions 702 and/or the managed data analysis 704. For example, based on a given type of analysis, a different subset of data available to the managed data 706 may be used to train the output of the chosen ML-AI models. For instance, when providing a recommended access and/or permissions, a part of that analysis may use data from the user's accounts, permission set, user's profile, and apps nodes as an input to one or more ML-AI models of the managed data analysis 704 and/or advanced solutions 702. When providing a recommended permission for a specific application, however, app accounts and credentials nodes may be used an input to the one or more ML-AI models, additionally and/or alternatively to the user's accounts, permission set, user's accounts, and apps nodes. Each of the one or more ML-AI models used to provide the respective recommendations may then be trained with data derived from the respective nodes utilized by the ML-AI models.

For example, the managed data 706 includes a graph database including a permissions set node 714, an application node 712, and a metadata node 710, each of which may include information associated with access policies. Each application (e.g., of application node 712) may have, on average, 50 access sets, and associated metadata (e.g., of metadata node 710) for each application (e.g., high risk, low risk, critical risk, public data) and classifications of data (e.g., protected health information (PHI)). The metadata may also provide data associated with how the application is used, how the data is managed, and who accesses the data. For instance, an application (e.g., of the application node 712) such as an account management application on a user device may communicate with the multiple components and data sources of the enterprise organization, the permissions set data (e.g., of permission set node 714) includes data associated with data sources and components the application may communicate with, and the metadata (e.g., of metadata node 710) includes data associated with the types of data accessed and created by the application. The example system 700 may obtain this data based on obtaining all data associated with certain data objects (e.g., department ID, who user reports to in organizational structure, user role and title, application access physical locations).

The system 700 may continually change and update (e.g., as applications update, transfer data, delete data) the data associated with these nodes, which may introduce complexity in managing the permissions data and providing up to date and accurate reviews of access policies. For instance, the edges between the permissions set node 714 and user's accounts node 716 for the user onboarding model may desire access to this interaction (e.g., the context and associated data with this updated data), and by system 700 providing this updated data in the graph database of managed data 706, system 700 allows the graph database to generate up to date and accurate associations between the updated data. Additionally, and/or alternatively, the graph database of managed data 706 may generate new nodes for the updated data and/or user responses to generated recommendations (e.g., upon request for the updated data or passively synchronizing the graph of the managed data 706), which further allows for current and accurate reflections of the appropriate access policies with their context and associated data. In other words, the example system 700 may enable lifelong learning, for example, through the relation of the previous nodes of the managed data 706 to the new and/or updated nodes of the managed data 706.

Additionally, and/or alternatively, the example system 700 may enable the advantages of the advanced solutions such as 360 review and data governance, which provide more accurate solutions with a reduced demand on computational resources. For instance, 360 review and data governance may require data on the user's identity, what the user should access, and what the user already has access to (e.g., number of accounts, accesses, when are accounts and accesses used). By generating the nodes within the graph database of managed data 706, the data may be provided to the AI/ML based managed data analysis 704 with the context and policies for the user (e.g., credentials node 720, app accounts node 708, permission set 714) already appropriately associated to that user (e.g., by virtue of the managed data 706 constantly maintaining the user's accounts node 716 and user's profile node 718), allowing for a reduced computational burden on the AI/ML based data analysis each time the analysis is performed.

The example system 700 may perform managed data analysis 704 using one or more AI/ML model based data analysis approaches. For example, the example system 700 may input to the AI/ML model a portion of the graph database and the AI/ML model may determine that a user is in the graph database, how other users share the same identification (e.g. department ID and/or organizational ID), and may go through that account to generate the recommendation (e.g., by associating the permissions belonging to users with the same organizational ID, and moving through lower and lower levels of the graph database into the access policies of more specific ID's (from department ID to under specific manager ID, from under specific manager ID to specific physical location ID). By doing so, the AI/ML model may determine the probabilities (e.g. accuracy) that each access is appropriate (e.g., based on how common that access is for a given user role, department ID). For instance, modeling an access as having a 70-90% probability may be determined to be normal, while probabilities of 60-30% may be abnormal. The recommendation provided to the manager for review may include both normal and abnormal accesses, while the accesses may be flagged (e.g., indicated) as normal and/or abnormal.

In some examples, the managed data analysis 704 may determine the accuracy of the recommendation based on reviewing data objects in the graph database. For example, looking at each permission set for a given department ID, each user of user's profile node 718 and/or user's accounts node 716 are not necessarily a single node: each node 718 and/or 716 may represent multiple sub nodes (e.g., as in FIG. 8), each of which represent a data object. Moreover, each may have a property that may be defined such that a node of node 716 has a separately assigned permission set 714. The managed data analysis 704 may extract the relevant nodes and edges (e.g., all nodes and edges, nodes with a minimum number of sub nodes) from the plurality of sub nodes based on the nodes and edges associated with a certain parameter to be matched (e.g., defined time period, event change, minimum hierarchy position, maximum hierarchy position, location, a data classification). For instance, the AI/ML based data analysis may move from the node level from neighbor to neighbor to neighbor (e.g., via a message passing approach) and extract the associated data. Accordingly, the managed data analysis may more accurately extract the relevant data and accesses for each recommendation, and do so with a decreased demand on computing resources each time the managed data analysis 704 is performed to produce a recommendation because the data is associated (e.g., easier to identify) in the managed data 706 more efficiently, e.g., than if the managed data analysis 704 generated the graph database each time a recommendation is requested.

Figure 8:
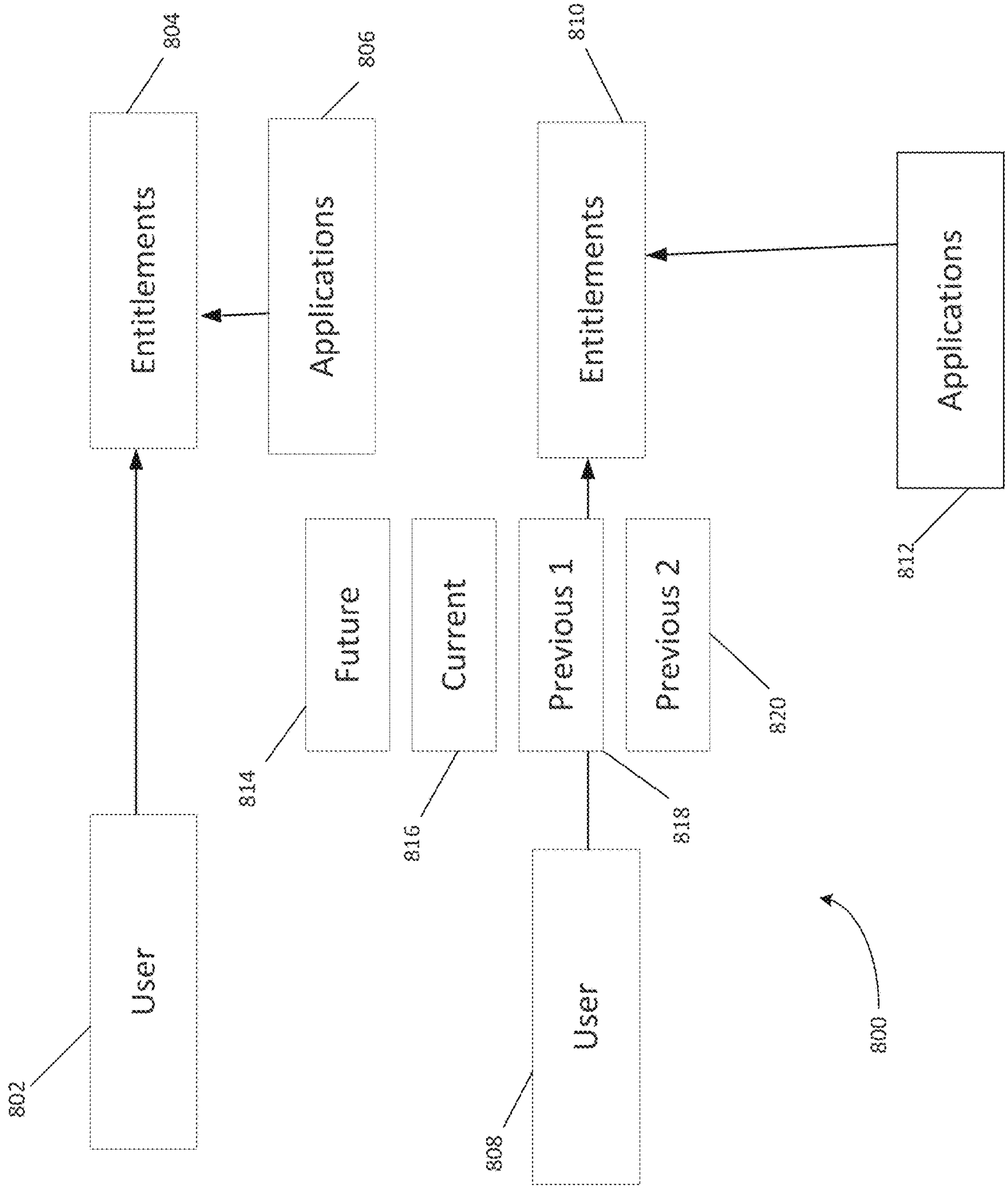
FIG. 8 is a depiction of an exemplary process for updating a graph database based on generating new nodes and edges of the graph database including historical data in accordance with one or more examples of the present application.

FIG. 8 provides an example process 800 for generating and/or updating a graph database (e.g., of the managed data 706 of FIG. 7) by creating an inventory for each node (e.g., applications node 712, metadata node 710, user node 802). A graph database may include node 802 representing user information (e.g., policies and/or profiles), node 804 representing entitlement information, and node 806 representing applications information 806. The graph database may relate node 802 and node 806 to node 804 by generating an edge from node 802 to node 804 and an edge from node 806 to node 804. However, when a graph database is updated (e.g., by obtaining and/or receiving data from a centralized repository such as an applications registration), different versions of information may be available (e.g., information for the same node but from different points in time). For example, an application may be updated to include new data (e.g., new metadata classifications such as PHI of the user). The updated data (e.g., JavaScript Objection Notation (JSON) format) may be obtained and used to generate new nodes and/or edges for the graph database, such that the graph database may be updated to replace node 802 with node 808 representing updated user information, to replace node 804 with node 810 representing updated entitlement information, and to replace node 806 with node 812 representing updated applications information 812. Additionally, the updated graph database may retain information from one or more of the previous nodes (e.g., node 802), which may be reflected in nodes 814, 816, 818, and 820. Additionally, and/or alternatively, the updated data may be used to generate new nodes of other node types (e.g., metadata node 710 of FIG. 7) and associated edges between the nodes.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method, comprising:

updating a graph database based on generating one or more new nodes and one or more new edges for the graph database, wherein the one or more new nodes and the one or more new edges are associated with onboarding information for a first user;

extracting, from the updated graph database, extracted graph data for the first user comprising at least one of the one or more new nodes and at least one of the one or more new edges, wherein the at least one of the one or more new edges connects the at least one of the one or more new nodes to one or more existing nodes;

inputting at least a portion of the extracted graph data for the first user into one or more machine learning-artificial intelligence (ML-AI) models to obtain one or more recommended user applications;

causing display of the one or more recommended user applications on a display device;

receiving second user input indicating approval for granting access to at least one recommended user application from the one or more recommended user applications; and providing instructions to direct a second computing platform to grant access to the at least one recommended user application.

2. The method of claim 1, wherein inputting at least the portion of the extracted graph data for the first user into the one or more ML-AI models further comprises:

inputting a first portion of the extracted graph data for the first user into one or more first ML-AI models to obtain a plurality of intermediate recommended user applications; and determining the one or more recommended user applications based on inputting a second portion of the extracted graph data for the first user and the plurality of intermediate recommended user applications into one or more second ML-AI models.

3. The method of claim 2, wherein determining the one or more recommended user applications comprises:

inputting the second portion of the extracted graph data for the first user and the plurality of intermediate recommended user applications into the one or more second ML-AI models to determine one or more user permissions; and determining the one or more recommended user applications based on the one or more user permissions and the plurality of intermediate recommended user applications.

4. The method of claim 2, wherein extracting the extracted graph data for the first user comprises:

extracting the first portion of the extracted graph data, wherein the first portion comprises a user title, a user role, a user job code, a user department, a user identification, access controls of a peer of the user, a user manager, and/or a hierarchy of the first user; and extracting the second portion of the extracted graph data, wherein the second portion comprises a system risk classification, a permissions risk classification, a system data classification, a permissions data classification, and/or a compliance requirement.

5. The method of claim 1, wherein updating the graph database based on generating the one or more new nodes and the one or more new edges further comprises:

generating the one or more new nodes based on the onboarding information for the first user; and generating the one or more new edges to connect the one or more new nodes to the existing one or more nodes from the graph database.

6. The method of claim 1, wherein updating the graph database based on generating the one or more new nodes and the one or more new edges for the graph database further comprises:

generating, based on the onboarding information for the first user, the one or more new nodes and the one or more new edges for the graph database;

obtaining, from an onboarding organization of the first user, application data related to an application associated with the onboarding information for the first user; and generating, based on the application data related to an application, one or more further new nodes and one or more further new edges for the graph database, wherein extracting, from the updated graph database, extracted graph data for the first user further comprises: extracting extracted graph data from the one or more new nodes, the one or more new edges, the one or more further new nodes, and the one or more further new edges for the graph database.

7. The method of claim 1, wherein updating the graph database based on generating the one or more new nodes and the one or more new edges for the graph database further comprises:

obtaining, from an onboarding organization of the first user, application data related to an application;

generating, based on the application data related to an application, one or more further new nodes for the graph database; and generating, based on the onboarding information for the first user, the one or more new nodes and one or more new edges between the one or more new nodes and the one or more further new nodes;

wherein extracting, from the updated graph database, extracted graph data for the first user further comprises: extracting extracted graph data from the one or more new nodes, the one or more new edges, the one or more further new nodes, and the one or more further new edges for the graph database.

8. The method of claim 1, wherein updating the graph database based on generating the one or more new nodes and the one or more new edges for the graph database further comprises:

generating, for the one or more existing nodes for the graph database, the one or more new nodes and the one or more new edges associated with the onboarding information for the first user, wherein each of the one or more new nodes for a respective one or more of the existing nodes is associated with different time periods of validity.

9. The method of claim 1, further comprising:

receiving a request to update user application access permissions for the first user;

in response to the request, inputting information into the one or more ML-AI models to obtain one or more updated recommended user applications for the first user; and providing instructions to direct the second computing platform to grant or restrict access to the first user based on the one or more updated recommended user applications for the first user.

10. The method of claim 1, further comprising:

generating, based on data obtained after onboarding the first user, one or more updated nodes for a respective one of the one or more new nodes, wherein the one or more updated nodes and the one or more new nodes are associated with the same data element, wherein extracting, from the updated graph database, the extracted graph data for the first user further comprises extracting graph data from the one or more updated nodes and the one or more new nodes.

11. The method of claim 1, further comprising:

before generating one or more new nodes and one or more new edges for the graph database, storing an existing graph database in memory, the existing graph database comprising the one or more existing nodes and one or more existing edges; and updating the existing graph database into the updated graph database based on generating the one or more new nodes and the one or more new edges, wherein extracting, from the updated graph database, the extracted graph data for the first user further comprises:

retrieving the existing graph database from memory; and extracting graph data from the one or more updated nodes, the one or more new nodes, the one or more existing nodes, and the one or more existing edges.

12. The method of claim 1, further comprising:

storing one or more recommendations output by the one or more ML-AI models in memory, wherein the one or more recommendations are associated with the obtained recommended user applications;

training the one or more ML-AI models based on the one or more stored recommendations and the second user input indicating approval for granting access to at least one recommended user application; and storing the trained one or more ML-AI models in memory, and wherein inputting at least the portion of the extracted graph data for the first user into the one or more ML-AI models further comprises retrieving the trained one or more ML-AI models from memory.

13. The method of claim 1, further comprising:

storing one or more recommendations output by the one or more ML-AI models in memory, wherein the one or more recommendations are associated with the obtained recommended user applications;

training the one or more ML-AI models based on the one or more stored recommendations and applications currently associated with the first user in the updated graph database; and storing the trained one or more ML-AI models in memory, and wherein inputting at least the portion of the extracted graph data for the first user into the one or more ML-AI models further comprises retrieving the trained one or more ML-AI models from memory.

14. A system, comprising:

an enterprise computing platform configured to:

update a graph database based on generating one or more new nodes and one or more new edges for the graph database, wherein the one or more new nodes and the one or more new edges are associated with onboarding information for a first user;

extract, from the updated graph database, extracted graph data for the first user comprising at least one of the one or more new nodes and at least one of the one or more new edges, wherein the at least one of the one or more new edges connects the at least one of the one or more new nodes to one or more existing nodes; and input at least a portion of the extracted graph data for the first user into one or more machine learning-artificial intelligence (ML-AI) models to obtain one or more recommended user applications, a user device comprising a display device and an input device, the user device configured to:

receive, from the enterprise computing platform, the one or more recommended user applications;

display the one or more recommended user applications on the display device; and receive, from the input device, second user input indicating approval for granting access to at least one recommended user application from the one or more recommended user application, and a second computing platform configured to:

receive instructions to grant access to the at least one recommended user application.

15. The system of claim 14, wherein inputting at least the portion of the extracted graph data for the first user into the one or more ML-AI models further comprises:

inputting a first portion of the extracted graph data for the first user into one or more first ML-AI models to obtain a plurality of intermediate recommended user applications; and determining the one or more recommended user applications based on inputting a second portion of the extracted graph data for the first user and the plurality of intermediate recommended user applications into one or more second ML-AI models.

16. The system of claim 14, wherein updating the graph database based on generating the one or more new nodes and the one or more new edges further comprises:

generating the one or more new nodes based on the onboarding information for the first user; and generating the one or more new edges to connect the one or more new nodes to the one or more existing nodes from the graph database.

17. The system of claim 14, wherein updating the graph database based on generating the one or more new nodes and the one or more new edges for the graph database further comprises:

generating, for the one or more existing nodes for the graph database, the one or more new nodes and the one or more new edges associated with the onboarding information for the first user, wherein each of the one or more new nodes for a respective one or more of the existing nodes is associated with different time periods of validity.

18. A non-transitory computer-readable medium having processor-executable instructions stored thereon, wherein the processor-executable instructions, when executed by one or more processors, facilitate:

updating a graph database based on generating one or more new nodes and one or more new edges for the graph database, wherein the one or more new nodes and the one or more new edges are associated with onboarding information for a first user;

extracting, from the updated graph database, extracted graph data for the first user comprising at least one of the one or more new nodes and at least one of the one or more new edges, wherein the at least one of the one or more new edges connects the at least one of the one or more new nodes to one or more existing nodes;

inputting at least a portion of the extracted graph data for the first user into one or more machine learning-artificial intelligence (ML-AI) models to obtain one or more recommended user applications;

causing display of the one or more recommended user applications on a display device;

receiving second user input indicating approval for granting access to at least one recommended user application from the one or more recommended user applications; and providing instructions to direct a second computing platform to grant access to the at least one recommended user application.

19. The non-transitory computer-readable medium of claim 18, wherein inputting at least the portion of the extracted graph data for the first user into the one or more ML-AI models further comprises:

inputting a first portion of the extracted graph data for the first user into one or more first ML-AI models to obtain a plurality of intermediate recommended user applications; and determining the one or more recommended user applications based on inputting a second portion of the extracted graph data for the first user and the plurality of intermediate recommended user applications into one or more second ML-AI models.

20. The non-transitory computer-readable medium of claim 18, wherein updating the graph database based on generating the one or more new nodes and the one or more new edges for the graph database further comprises:

generating, for the one or more existing nodes for the graph database, the one or more new nodes and the one or more new edges associated with the onboarding information for the first user, wherein each of the one or more new nodes for a respective one or more of the existing nodes is associated with different time periods of validity.

* * * * *